US011411675B2

(12) United States Patent
Liu et al.

(10) Patent No.: US 11,411,675 B2
(45) Date of Patent: Aug. 9, 2022

(54) METHOD AND DEVICE IN COMMUNICATION NODES FOR WIRELESS COMMUNICATION WITH LARGE PROPAGATION DELAY DIFFERENCE

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 160 days.

(21) Appl. No.: 16/860,090

(22) Filed: Apr. 28, 2020

(65) Prior Publication Data

US 2020/0358553 A1    Nov. 12, 2020

(30) Foreign Application Priority Data

May 9, 2019  (CN) .......................... 201910382910.3

(51) Int. Cl.
*H04L 1/00*      (2006.01)
*H04W 72/04*   (2009.01)
(Continued)

(52) U.S. Cl.
CPC .......... *H04L 1/0038* (2013.01); *H04L 5/0082* (2013.01); *H04W 24/08* (2013.01); *H04W 72/0446* (2013.01)

(58) Field of Classification Search
None
See application file for complete search history.

(56) References Cited

U.S. PATENT DOCUMENTS

| 2021/0058873 | A1* | 2/2021 | Gao | ...................... H04W 52/54 |
| 2021/0377954 | A1* | 12/2021 | Mi | ...................... H04W 72/042 |
| 2021/0377987 | A1* | 12/2021 | Gong | .................... H04W 72/12 |

FOREIGN PATENT DOCUMENTS

| CN | 107888238 A | 4/2018 |
| CN | 108260209 A | 7/2018 |

(Continued)

OTHER PUBLICATIONS

Notification to grant patent right for invention action received in application No. 201910382910.3 dated Apr. 1, 2022.

(Continued)

*Primary Examiner* — Saad Khawar

(57) ABSTRACT

A method and a device in communication nodes used for wireless communications. A communication node receives first information, transmits a first radio signal, and monitors a first-type signaling in a first time window. Wherein an end time for a transmission of the first radio signal is used for determining a start of the first time window, and a time-domain resource occupied by the first radio signal is used for determining a first characteristic identity. The first characteristic identity is one of M characteristic identities, M being a positive integer greater than 1, and the first information is used for determining the M characteristic identities. The first-type signaling carries one of the M characteristic identities, and the communication node determines a characteristic identity carried by the first-type signaling out of the M characteristic identities through blind detection. The random access performance is therefore improved.

20 Claims, 13 Drawing Sheets

(51) Int. Cl.
*H04W 24/08* (2009.01)
*H04L 5/00* (2006.01)

(56) References Cited

FOREIGN PATENT DOCUMENTS

| | | | |
|---|---|---|---|
| CN | 108401298 A | 8/2018 |
| CN | 111918379 A | 1/2020 |
| WO | 2017185304 A1 | 11/2017 |
| WO | 2019006592 A1 | 1/2019 |

OTHER PUBLICATIONS

CN 1st Search Report received in application No. 201910382910.3 dated Mar. 24, 2022.

* cited by examiner

METHOD AND DEVICE IN COMMUNICATION NODES FOR WIRELESS COMMUNICATION WITH LARGE PROPAGATION DELAY DIFFERENCE

CROSS REFERENCE TO RELATED APPLICATIONS

This application claims the priority benefit of Chinese Patent Application No. CN 201910382910.3, filed on May 9, 2019, the full disclosure of which is incorporated herein by reference.

BACKGROUND

Technical Field

The present disclosure relates to transmission methods and devices in wireless communication systems, and in particular to a method and device of transmission with large propagation delay difference.

Related Art

As future application scenarios of wireless communication systems become increasingly diversified, varying performance requirements have been posed on the systems. In order to meet such performance requirements of various application scenarios, it was decided at the 3rd Generation Partner Project (3GPP) Radio Access Network (RAN) #72 plenary session that a study on New Radio (NR), or what is called Fifth Generation (5G) shall be conducted. The work item of NR was approved at the 3GPP RAN #75 plenary session to standardize NR.

The 3GPP RAN #75 plenary session also approved a study item of NR-backed Non-Terrestrial Networks (NTN), which started with R 15, to meet varying application scenarios and requirements. At the 3GPP RAN #79 plenary session a decision was made on the study of solutions for NTN network and a WI to standardize relevant techniques was initialized in R16 or R17 afterwards.

SUMMARY

In NTN, a User Equipment (UE) is in communication with a satellite or an aircraft through the 5G network. Since the distance from a satellite or an aircraft to a UE is much longer than that from a terrestrial base station to a UE, there will be a long propagation delay in communications between the satellite or aircraft and the UE. Besides, when a satellite is used as relay equipment for a terrestrial base station, the delay of a Feeder Link between the satellite and the terrestrial base station will lead to longer propagation delay between the UE and the base station. What's more, the coverage of a satellite and an aircraft is much larger than terrestrial networks, and as the inclination angle of the terrestrial equipment to the satellite or the aircraft varies, significant changes of delay will be seen in NTN. In the current Long Term Evolution (LTE) or 5G NR system, a largest propagation delay difference only lasts a couple of or a few dozens of milliseconds, in contrast, a largest propagation delay difference can reach tens of milliseconds in NTN. In the existing LTE or NR random access is designed solely for conventional terrestrial communications and does not apply directly to NTN, so a new design will be demanded for supporting large-delay difference networks, NTN communications in particular.

To address the problem that lies in random access in large-delay difference networks, particularly in NTN communications, the present disclosure provides a solution. It should be noted that the embodiments of the base station of the present disclosure and the characteristics in the embodiments can be applied to the UE if no conflict is incurred, and vice versa. Further, the embodiments in the present disclosure and characteristics in the embodiments can be arbitrarily combined if there is no conflict.

The present disclosure provides a method in a first communication node for wireless communications, comprising:
receiving first information;
transmitting a first radio signal; and
monitoring a first-type signaling in a first time window;
herein, an end time for a transmission of the first radio signal is used for determining a start of the first time window, time domain resource occupied by the first radio signal is used for determining a first characteristic identity; the first characteristic identity is one of M characteristic identities, M is a positive integer greater than 1, the first information is used for determining the M characteristic identities; the first-type signaling carries one of the M characteristic identities, the first communication node determines a characteristic identity carried by the first-type signaling out of the M characteristic identities through blind detection.

In one embodiment, the first communication node performs blind detection on the M characteristic identities so that the first communication node can acquire a Message B (MsgB) in a random access response (RAR) or 2-step random access without determining an RNTI employed by the network when transmitting the first-type signaling, thus guaranteeing successful access.

In one embodiment, the first information enables the first communication node to determine an RNTI that may be used at the network side so as to avoid excess blind detection on the RNTI by the first communication node, thus reducing the complexity of the blind detection.

In one embodiment, the first communication node performs blind detection on the M characteristic identities so as to support calculation of an RNTI employed by the first-type signaling based on when a PRACH is received at the network side, and also to support calculation of an RNTI employed by the first-type signaling based on when a PRACH is transmitted at the UE side while the network side fails to judge when a PRACH is transmitted from the UE side, thus addressing the ambiguity of RNTI judgement caused by large delay difference in NTN.

According to one aspect of the present disclosure, the above method is characterized in that the first information is used for determining a first time length, the time domain resource occupied by the first radio signal and the first time length are used for determining X time domain resource blocks, the X time domain resource blocks are divided into M time domain resource block groups, time-domain positions of the M time domain resource block groups are respectively used for determining the M characteristic identities, X is a positive integer no less than the M.

In one embodiment, the network side can adjust the first time length based on information about the type and coverage of a satellite or an aircraft, and the M characteristic identities all change with the adjustment, thereby providing a method commonly used in large-delay-difference networks.

According to one aspect of the present disclosure, the above method is characterized in that radio resources occupied by the first radio signal belong to a radio resource block in a first radio resource block set, the first radio resource block set comprises a positive integer number of radio resource blocks; the first communication node randomly selects the radio resources occupied by the first radio signal from the first radio resource block set; the first radio resource block set is one of W candidate radio resource block sets, W is a positive integer number greater than 1, a position of the first radio resource block set among the W candidate radio resource block sets is used for indicating a positioning capability of the first communication node.

In one embodiment, through partition of time-frequency resources or code domain resources in a PRACH, the UE is enabled to report its positioning capability to the network as soon as possible, therefore, the network can configure an RNTI needed for blind detection of the UE according to the positioning capability of the UE, reduce the complexity of blind detection and at the same time support optimization specific to the system.

According to one aspect of the present disclosure, the above method is characterized in further comprising:
receiving second information;
herein, the second information is used for determining a length of a time interval between the start of the first time window and the end time for the transmission of the first radio signal.

According to one aspect of the present disclosure, the above method is characterized in further comprising:
transmitting a second radio signal;
herein, the second radio signal carries third information, the third information is used for indicating a position of the time domain resource occupied by the first radio signal in time domain, a start time for a transmission of the second radio signal is later than the end time for the transmission of the first radio signal.

In one embodiment, when the network side fails to determine a correct transmission time of a PRACH corresponding to a detected preamble due to ambiguity in uplink timing determination, an introduction of the third information will help the network side acquire the correct transmission time of the PRACH corresponding to the detected preamble so as to calculate the correct TA, thereby ensuring uplink synchronization, preventing inter-symbol interference and inter-subcarrier interference, and enhancing both uplink transmission performance and uplink capacity.

According to one aspect of the present disclosure, the above method is characterized in that the first information is used for determining length of the first time window.

In one embodiment, associating the length of the first time window with the first time length will increase the chance of detecting an RAR scheduling signaling by the UE and improve random access performance.

According to one aspect of the present disclosure, the above method is characterized in further comprising:
receiving a third radio signal;
herein, the first-type signaling detected in the first time window is used for determining time-frequency resources occupied by the third radio signal; the third radio signal carries fourth information, the fourth information is used for determining a first timing advance, the first timing advance is used for determining a transmission timing of a radio signal transmitted later than the first radio signal.

According to one aspect of the present disclosure, the above method is characterized in that the fourth information is used for determining a second time length, the first communication node assumes that the second time length is equal to a length of a time interval between a reception time of the first radio signal and a transmission time of the first-type signaling.

In one embodiment, when a UE detects a plurality of Timing Advances (TAs), it cannot determine which TA is a UE-targeted timing adjustment. The method of using the fourth information for determining the second time length is proposed as a solution that enables the UE to determine which TA may be used for the UE's uplink timing based on a timing of the first radio signal and a timing of the first-type signaling as well as the second time length and a TA value in an RAR scheduled by the first-type signaling, thereby enhancing the performance of random access and ensuring uplink synchronization.

The present disclosure provides a method in a second communication node for wireless communications, comprising:
transmitting first information;
receiving a first radio signal; and
transmitting a first-type signaling in a first time window;
herein, an end time for a transmission of the first radio signal is used for determining a start of the first time window, time domain resource occupied by the first radio signal is used for determining a first characteristic identity; the first characteristic identity is one of M characteristic identities, M is a positive integer greater than 1, the first information is used for determining the M characteristic identities; the first-type signaling carries one of the M characteristic identities, a transmitter of the first radio signal determines a characteristic identity carried by the first-type signaling out of the M characteristic identities through blind detection.

According to one aspect of the present disclosure, the above method is characterized in that the first information is used for determining a first time length, the time domain resource occupied by the first radio signal and the first time length are used for determining X time domain resource blocks, the X time domain resource blocks are divided into M time domain resource block groups, time-domain positions of the M time domain resource block groups are respectively used for determining the M characteristic identities, X is a positive integer no less than the M.

According to one aspect of the present disclosure, the above method is characterized in that radio resources occupied by the first radio signal belong to a radio resource block in a first radio resource block set, the first radio resource block set comprises a positive integer number of radio resource blocks; the first communication node randomly selects the radio resources occupied by the first radio signal from the first radio resource block set; the first radio resource block set is one of W candidate radio resource block sets, W is a positive integer number greater than 1, a position of the first radio resource block set among the W candidate radio resource block sets is used for indicating a positioning capability of the first communication node.

According to one aspect of the present disclosure, the above method is characterized in further comprising:
transmitting second information;
herein, the second information is used for determining a length of a time interval between the start of the first time window and the end time for the transmission of the first radio signal.

According to one aspect of the present disclosure, the above method is characterized in further comprising:
receiving a second radio signal;
herein, the second radio signal carries third information, the third information is used for indicating a position of the time domain resource occupied by the first radio signal in time domain, a start time for a transmission of the second radio signal is later than the end time for the transmission of the first radio signal.

According to one aspect of the present disclosure, the above method is characterized in that the first information is used for determining a length of the first time window.

According to one aspect of the present disclosure, the above method is characterized in further comprising:

transmitting a third radio signal;

herein, the first-type signaling detected in the first time window is used for determining time-frequency resources occupied by the third radio signal; the third radio signal carries fourth information, the fourth information is used for determining a first timing advance, the first timing advance is used for determining a transmission timing of a radio signal transmitted later than the first radio signal.

According to one aspect of the present disclosure, the above method is characterized in that the fourth information is used for determining a second time length, the first communication node assumes that the second time length is equal to a length of a time interval between a reception time of the first radio signal and a transmission time of the first-type signaling.

The present disclosure provides a first communication node for wireless communications, comprising:

a first receiver, receiving first information;

a first transmitter, transmitting a first radio signal; and a second receiver, monitoring a first-type signaling;

herein, an end time for a transmission of the first radio signal is used for determining a start of the first time window, time domain resource occupied by the first radio signal is used for determining a first characteristic identity; the first characteristic identity is one of M characteristic identities, M is a positive integer greater than 1, the first information is used for determining the M characteristic identities; the first-type signaling carries one of the M characteristic identities, the first communication node determines a characteristic identity carried by the first-type signaling out of the M characteristic identities through blind detection.

The present disclosure provides a second communication node for wireless communications, comprising:

a second transmitter, transmitting first information;

a third receiver, receiving a first radio signal; and a third transmitter, transmitting a first-type signaling in a first time window;

herein, an end time for a transmission of the first radio signal is used for determining a start of the first time window, time domain resource occupied by the first radio signal is used for determining a first characteristic identity; the first characteristic identity is one of M characteristic identities, M is a positive integer greater than 1, the first information is used for determining the M characteristic identities; the first-type signaling carries one of the M characteristic identities, a transmitter of the first radio signal determines a characteristic identity carried by the first-type signaling out of the M characteristic identities through blind detection.

In one embodiment, compared with the method of random access in the existing terrestrial network, the present disclosure has shown the following technical advantages:

When an RNTI employed by the network when transmitting RAR scheduling signaling cannot be determined, the method in the present disclosure makes it possible to acquire Msg B in RAR or 2-step random access, thus ensuring successful random access.

The method in the present disclosure enables the UE to acquire an RNTI in need of blind detection based on the network side configuration, so that excess blind detection on the RNTI of the UE can be avoided and thus the complexity of blind detection is reduced.

The method in the present disclosure supports the case of calculating an RNTI of RAR based on the time when a PRACH is received at the network side, and also supports the case where an RNTI employed by RAR is calculated based on the time when a PRACH is transmitted by the user side but the network cannot precisely determine the time when the PRACH is transmitted from the user side, thus solving the problem of ambiguity in RNTI determination resulted from a large delay difference in NTN.

By using the method in the present disclosure, the network side is able to adjust the length of a time window for calculating RNTI according to information about the type or coverage of a satellite or an aircraft, which is generally applied in a large-delay-difference network.

The method in the present disclosure applies partition of time-frequency resources or code domain resources in a PRACH so that the UE is able to report its positioning capability to the network as soon as possible. Then the network can configure an RNTI that needs blind detection according to the positioning capability of the UE, thereby making the UE's blind detection less complicated and supporting specialized system optimization.

When addressing ambiguity of determination on uplink timing by the network side, the method in the present disclosure is used to make the network acquire the accurate transmission time of a PRACH corresponding to a detected preamble so as to calculate the correct TA. This method not only guarantees uplink synchronization, prevents inter-symbol or inter-subcarrier interference but also improves uplink transmission performance and uplink capacity.

By associating the length of an RAR monitoring window with a largest delay difference, the method helps increase the chance of detecting RAR scheduling signaling by the UE and improves the random access performance.

When the UE detects a plurality of TAs, it is unable to determine which of the TAs is a timing adjustment targeted for itself. The method in the present disclosure enables a UE to determine which TA can be used for uplink timing of the UE based on a transmission timing of a PRACH and a reception timing of a scheduling signaling for RAR (or Msg B in 2-step random access) as well as reception and transmission delays at the network side and TA value.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
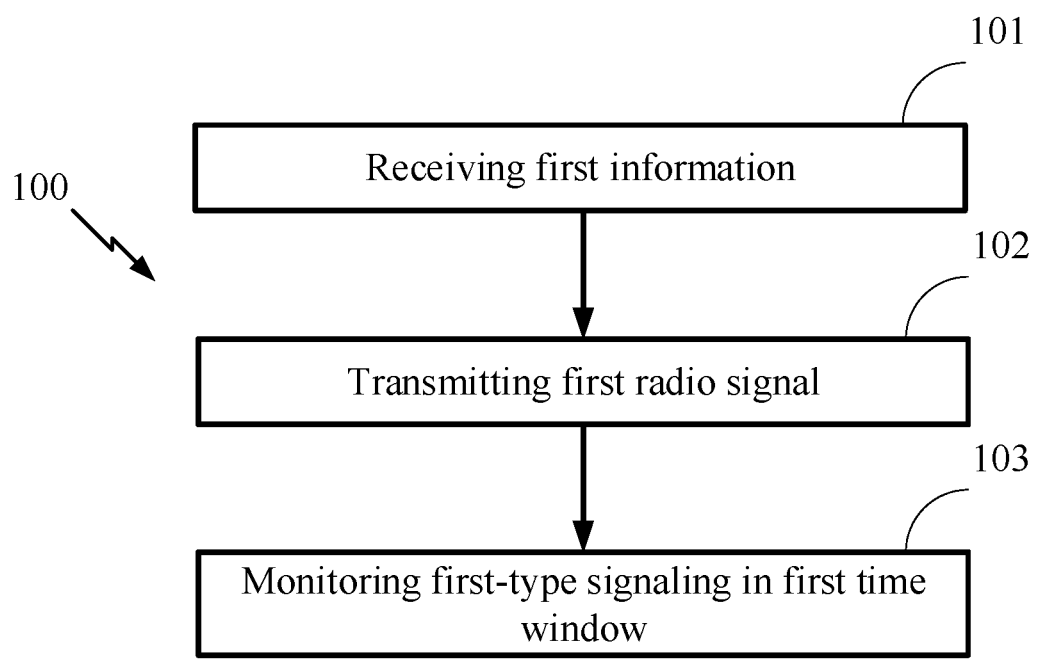
FIG. 1 illustrates a flowchart of first information, a first radio signal and a first-type signaling according to one embodiment of the present disclosure.

Embodiment 1 illustrates a flowchart of first information, a first radio signal and a first-type signaling according to one embodiment of the present disclosure, as shown in FIG. 1. In FIG. 1, each box represents a step. It should be noted that the order of each box does not necessarily mean the time sequence of steps represented hereby.

In Embodiment 1, the first communication node in the present disclosure receives first information in step 101; transmits a first radio signal in step 102; monitors a first-type signaling in step 103; an end time for a transmission of the first radio signal is used for determining a start of the first time window, time domain resource occupied by the first radio signal is used for determining a first characteristic identity; the first characteristic identity is one of M characteristic identities, M is a positive integer greater than 1, the first information is used for determining the M characteristic identities; the first-type signaling carries one of the M characteristic identities, the first communication node determines a characteristic identity carried by the first-type signaling out of the M characteristic identities through blind detection.

In one embodiment, the first information is transmitted via a higher layer signaling.

In one embodiment, the first information is transmitted via a physical layer signaling.

In one embodiment, the first information comprises all or part of a higher layer signaling.

In one embodiment, the first information comprises all or part of a physical layer signaling.

In one embodiment, the first information comprises all or part of Information Elements (IEs) in a Radio Resource Control (RRC) signaling.

In one embodiment, the first information comprises all or part of fields of an IE in an RRC signaling.

In one embodiment, the first information comprises all or part of fields of a Medium Access Control (MAC) layer signaling.

In one embodiment, the first information comprises all or part of a System Information Block (SIB).

In one embodiment, the first information comprises all or part of a MAC Control Element (CE).

In one embodiment, the first information comprises all or part of a MAC Header.

In one embodiment, the first information is transmitted through a Downlink Shared Channel (DL-SCH).

In one embodiment, the first information is transmitted through a Physical Downlink Shared Channel (PDSCH).

In one embodiment, the first information is related to a coverage area of the second communication node.

In one embodiment, the first information is related to a height of the second communication node.

In one embodiment, the first information is related to a type of the second communication node.

In one embodiment, the first information is related to an inclination of the second communication node in the present disclosure relative to the first communication node in the present disclosure.

In one embodiment, the first information is related to a coverage area size of the second communication node in the present disclosure.

In one embodiment, the first information is broadcast.

In one embodiment, the first information is cell-specific.

In one embodiment, the first information is UE-specific.

In one embodiment, the first information is UE group-specific.

In one embodiment, the first information is geographic region-specific.

In one embodiment, the first information is transmitted through a Physical Downlink Control Channel (PDCCH).

In one embodiment, the first information comprises all or part of fields of a Downlink Control Information (DCI) signaling.

In one embodiment, the above phrase that the first information is used for determining the M characteristic identities includes the meaning that the first information is used by the first communication node for determining the M characteristic identities.

In one embodiment, the above phrase that the first information is used for determining the M characteristic identities includes the meaning that the first information is used for directly indicating the M characteristic identities.

In one embodiment, the above phrase that the first information is used for determining the M characteristic identities includes the meaning that the first information is used for indirectly indicating the M characteristic identities.

In one embodiment, the above phrase that the first information is used for determining the M characteristic identities includes the meaning that the first information is used for explicitly indicating the M characteristic identities.

In one embodiment, the above phrase that the first information is used for determining the M characteristic identities includes the meaning that the first information is used for implicitly indicating the M characteristic identities.

In one embodiment, the first information is transmitted via an air interface.

In one embodiment, the first information is transmitted via a wireless interface.

In one embodiment, the first information is transmitted via an interface between the second communication node in the present disclosure and the first communication node in the present disclosure.

In one embodiment, the first information is transmitted via a Uu interface.

In one embodiment, the first radio signal is a Physical Random Access Channel (PRACH).

In one embodiment, the first radio signal comprises a PRACH and a Physical Uplink Shared Channel (PUSCH).

In one embodiment, the first radio signal carries a message (Msg) 1 in 4-step random access.

In one embodiment, the first radio signal carries a message (Msg) A in 2-step random access.

In one embodiment, the first radio signal carries a preamble.

In one embodiment, a pseudo-random sequence is used for generating the first radio signal.

In one embodiment, a Zadoff-Chu (ZC) sequence is used for generating the first radio signal.

In one embodiment, a Zadoff-Chu (ZC) sequence of the length of 839 is used for generating the first radio signal.

In one embodiment, a Zadoff-Chu (ZC) sequence of the length of 139 is used for generating the first radio signal.

In one embodiment, the first radio signal is transmitted through an Uplink Shared Channel (UL-SCH).

In one embodiment, the first radio signal is transmitted through a PUSCH.

In one embodiment, the first radio signal is generated by a Transport Block (TB) sequentially through CRC Insertion, Channel Coding, Rate Matching, Scrambling, Modulation, Layer Mapping, Precoding, Mapping to Virtual Resource Blocks, Mapping from Virtual to Physical Resource Blocks, Orthogonal Frequency Division Multiplexing (OFDM) Baseband Signal Generation, and Modulation and Upconversion.

In one embodiment, a ZC sequence and a TB are together used for generating the first radio signal.

In one embodiment, the first radio signal comprises a PUSCH and a Demodulation Reference Signal (DMRS).

In one embodiment, the first radio signal only comprises a PUSCH.

In one embodiment, the first time window comprises a positive integer number of contiguous slots with a given subcarrier spacing (SCS).

In one embodiment, the first time window comprises a positive integer number of contiguous OFDM symbols with a given SCS.

In one embodiment, the first time window comprises a positive integer number of contiguous subframes.

In one embodiment, a start and an end of the first time window are aligned with boundaries of downlink multicarrier symbols.

In one embodiment, a start and an end of the first time window are aligned with boundaries of downlink In one embodiment, the first time window is a Random Access Response (RAR) window.

In one embodiment, the first time window is used for monitoring on a message (Msg)2 in 4-step random access.

In one embodiment, the first time window is used for monitoring on an MsgB in 2-step random access.

In one embodiment, the monitoring on the first-type signaling is implemented by decoding of the first-type signaling.

In one embodiment, the monitoring on the first-type signaling is implemented by blind decoding of the first-type signaling.

In one embodiment, the monitoring on the first-type signaling is implemented by decoding and Cyclic Redundancy Check (CRC) of the first-type signaling.

In one embodiment, the monitoring on the first-type signaling is implemented by decoding of the first-type signaling and CRC scrambled by one of the M characteristic identities.

In one embodiment, the monitoring on the first-type signaling is implemented by decoding of the first-type signaling based on the type of the first-type signaling.

In one embodiment, the first-type signaling is transmitted via an air interface.

In one embodiment, the first-type signaling is transmitted via a wireless interface.

In one embodiment, the first-type signaling is transmitted via a Uu interface.

In one embodiment, the first-type signaling is a physical layer signaling.

In one embodiment, the first-type signaling is transmitted through a PDCCH.

In one embodiment, the first-type signaling comprises all or part of fields of a piece of DCI.

In one embodiment, the first-type signaling comprises all or part of fields of a piece of DCI in a given DCI format.

In one embodiment, the first-type signaling comprises all or part of fields of a piece of DCI in a DCI format 1-0.

In one embodiment, the monitoring on the first-type signaling is performed in common search space (CSS).

In one embodiment, the monitoring on the first-type signaling is performed in UE-specific Search Space (USS).

In one embodiment, the first-type signaling is a piece of DCI for scheduling a PDSCH carrying an RAR.

In one embodiment, the first-type signaling is a PDCCH for scheduling a PDSCH carrying an RAR.

In one embodiment, the first-type signaling is a piece of DCI for scheduling a PDSCH carrying an MsgB.

In one embodiment, the first-type signaling is a PDCCH for scheduling a PDSCH carrying an MsgB.

In one embodiment, in the process of monitoring the first-type signaling in the first time window, only one first-type signaling is detected.

In one embodiment, in the process of monitoring the first-type signaling in the first time window, more than one first-type signalings is detected.

In one embodiment, in the process of monitoring the first-type signaling in the first time window, no first-type signaling is detected.

In one embodiment, in the process of monitoring the first-type signaling in the first time window, only one first-type signaling passes CRC scrambled by one of the M characteristic identities after channel decoding.

In one embodiment, in the process of monitoring the first-type signaling in the first time window, more than one first-type signaling passes CRC scrambled by one of the M characteristic identities after channel decoding.

In one embodiment, in the process of monitoring the first-type signaling in the first time window, no first-type signaling passes CRC scrambled by one of the M characteristic identities after channel decoding.

In one embodiment, an end time for a transmission of the first radio signal is an end time for a transmission of a Preamble comprised in the first radio signal.

In one embodiment, an end time for a transmission of the first radio signal is an end time for a transmission of a PUSCH comprised in the first radio signal.

In one embodiment, the above phrase that an end time for a transmission of the first radio signal is used for determining a start of the first time window includes the following meaning: the end time for a transmission of the first radio signal is used by the first communication node of the present disclosure for determining a start of the first time window.

In one embodiment, the above phrase that an end time for a transmission of the first radio signal is used for determining a start of the first time window includes the following meaning: the end time for a transmission of the first radio signal is the start of the first time window.

In one embodiment, the above phrase that an end time for a transmission of the first radio signal is used for determining a start of the first time window includes the following meaning: the end time for a transmission of the first radio signal is earlier than the start of the first time window.

In one embodiment, the above phrase that an end time for a transmission of the first radio signal is used for determining a start of the first time window includes the following meaning: the end time for a transmission of the first radio signal is earlier than the start of the first time window, and the length of a time interval between the end time for a transmission of the first radio signal and the start of the first time window is configurable.

In one embodiment, the above phrase that an end time for a transmission of the first radio signal is used for determining a start of the first time window includes the following meaning: the end time for a transmission of the first radio signal is earlier than the start of the first time window, and the start of the first time window is a start time for an earliest Type I PDCCH CSS set not earlier than the end time for a transmission of the first radio signal.

In one embodiment, the above phrase that time domain resource occupied by the first radio signal is used for determining a first characteristic identity includes the following meaning: the time domain resource occupied by the first radio signal is used by the first communication node for determining the first characteristic identity.

In one embodiment, the above phrase that time domain resource occupied by the first radio signal is used for determining a first characteristic identity includes the following meaning: the position of the time domain resource occupied by the first radio signal is used for determining the first characteristic identity.

In one embodiment, the above phrase that time domain resource occupied by the first radio signal is used for determining a first characteristic identity includes the following meaning: an index of an earliest OFDM symbol of all OFDM symbols occupied by the first radio signal in a slot to which the earliest OFDM symbol belongs is used for determining the first characteristic identity.

In one embodiment, the above phrase that time domain resource occupied by the first radio signal is used for determining a first characteristic identity includes the following meaning: an index of an earliest slot of all slots to which time domain resource occupied by the first radio signal belongs in a system frame is used for determining the first characteristic identity.

In one embodiment, the above phrase that time domain resource occupied by the first radio signal is used for determining a first characteristic identity includes the following meaning: an index of an earliest OFDM symbol of all OFDM symbols occupied by the first radio signal in a slot to which the earliest OFDM symbol belongs is used for determining the first characteristic identity; an index of an earliest slot of all slots to which time domain resource occupied by the first radio signal belongs in a system frame is used for determining the first characteristic identity.

In one embodiment, time domain resource occupied by the first radio signal comprises a positive integer number of OFDM symbol(s).

In one embodiment, the first characteristic identity is a non-negative integer.

In one embodiment, the first characteristic identity is a Radio Network Temporary Identity (RNTI).

In one embodiment, the first characteristic identity is a Random Access Radio Network Temporary Identity (RA-RNTI).

In one embodiment, the first characteristic identity is a hexadecimal integer through FFF0 and FFFD.

In one embodiment, any of the M characteristic identities is a non-negative integer.

In one embodiment, any of the M characteristic identities is an RNTI.

In one embodiment, any of the M characteristic identities is an RA-RNTI.

In one embodiment, any of the M characteristic identities is equal to a hexadecimal integer through FFF0 and FFFD.

In one embodiment, any two of the M characteristic identities are difference from each other.

In one embodiment, each of the M characteristic identities carried by the first-type signaling is as same as the first characteristic identity.

In one embodiment, each of the M characteristic identities carried by the first-type signaling is different from the first characteristic identity.

In one embodiment, the above phrase that the first-type signaling carries one of the M characteristic identities includes the meaning that CRC comprised in the first-type signaling carries one of the M characteristic identities.

In one embodiment, the above phrase that the first-type signaling carries one of the M characteristic identities includes the meaning that a payload of the first-type signaling carries one of the M characteristic identities.

In one embodiment, the above phrase that the first-type signaling carries one of the M characteristic identities includes the meaning that a check bit of the first-type signaling carries one of the M characteristic identities.

In one embodiment, the above phrase that the first-type signaling carries one of the M characteristic identities includes the meaning that CRC of the first-type signaling is scrambled by one of the M characteristic identities.

In one embodiment, the blind detection of the above phrase that the first communication node determines a characteristic identity carried by the first-type signaling out of the M characteristic identities through blind detection is implemented through decoding of the first-type signaling.

In one embodiment, the blind detection of the above phrase that the first communication node determines a characteristic identity carried by the first-type signaling out of the M characteristic identities through blind detection is implemented through CRC after channel decoding of the first-type signaling.

In one embodiment, the above phrase that the first communication node determines a characteristic identity carried by the first-type signaling out of the M characteristic identities through blind detection includes the following meaning: the first communication node decodes the first-type signaling targeting each of the M characteristic identities, when the first-type signaling is correctly decoded a corresponding characteristic identity of the first-type signaling is the characteristic identity carried by the first-type signaling.

In one embodiment, the above phrase that the first communication node determines a characteristic identity carried by the first-type signaling out of the M characteristic identities through blind detection includes the following meaning: after performing channel decoding on the first-type signaling, the first communication node performs CRC on each of the M characteristic identities, and a characteristic identity that passes check is the characteristic identity carried by the first-type signaling.

Embodiment 2

Figure 2:
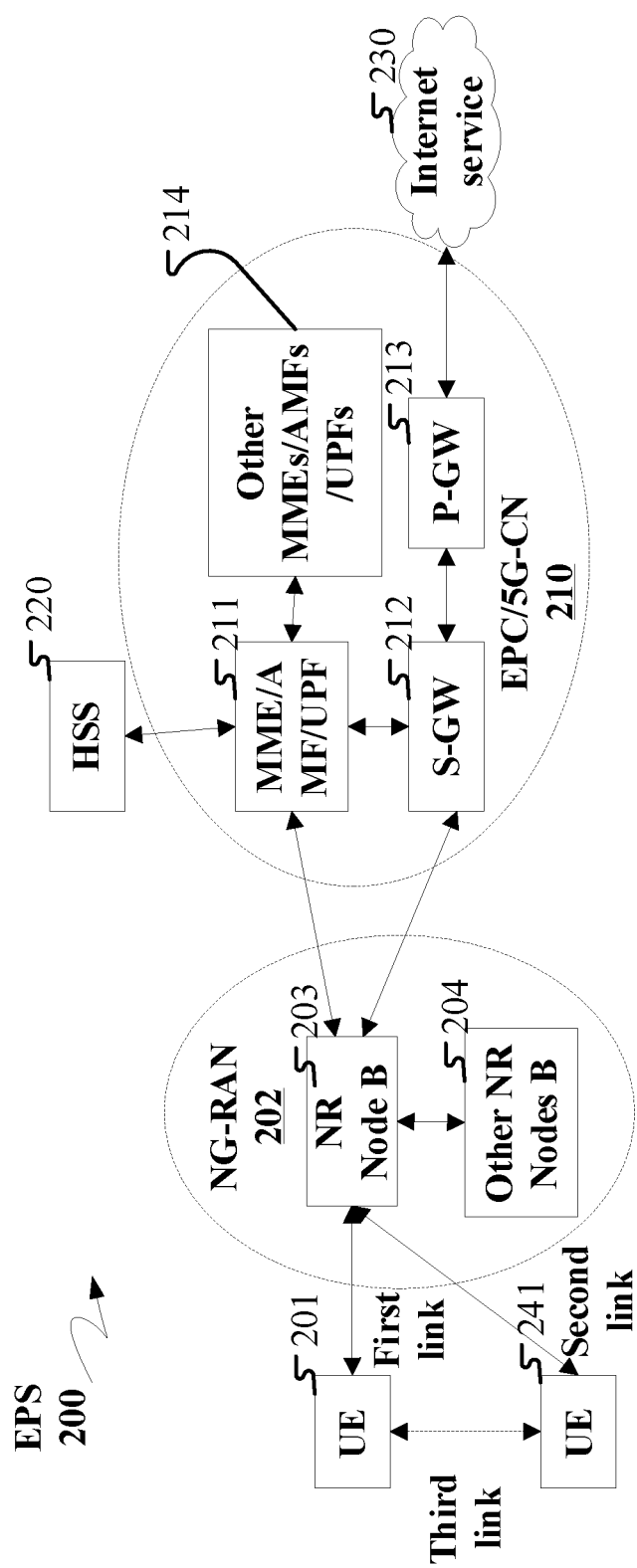
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN networks, a gNB 203 may be a satellite or a terrestrial base station relayed by satellites. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMEs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet and Intranet, IP Multimedia Subsystem (IMS).

In one embodiment, the UE 201 corresponds to the first communication node in the present disclosure.

In one embodiment, the UE 201 supports NTN communication.

In one embodiment, the UE 201 supports large-delay-difference network communication.

In one embodiment, the gNB 203 corresponds to the first communication node in the present disclosure.

In one embodiment, the gNB 203 supports NTN communication.

In one embodiment, the gNB 203 supports large-delay-difference network communication.

Embodiment 3

Figure 3:
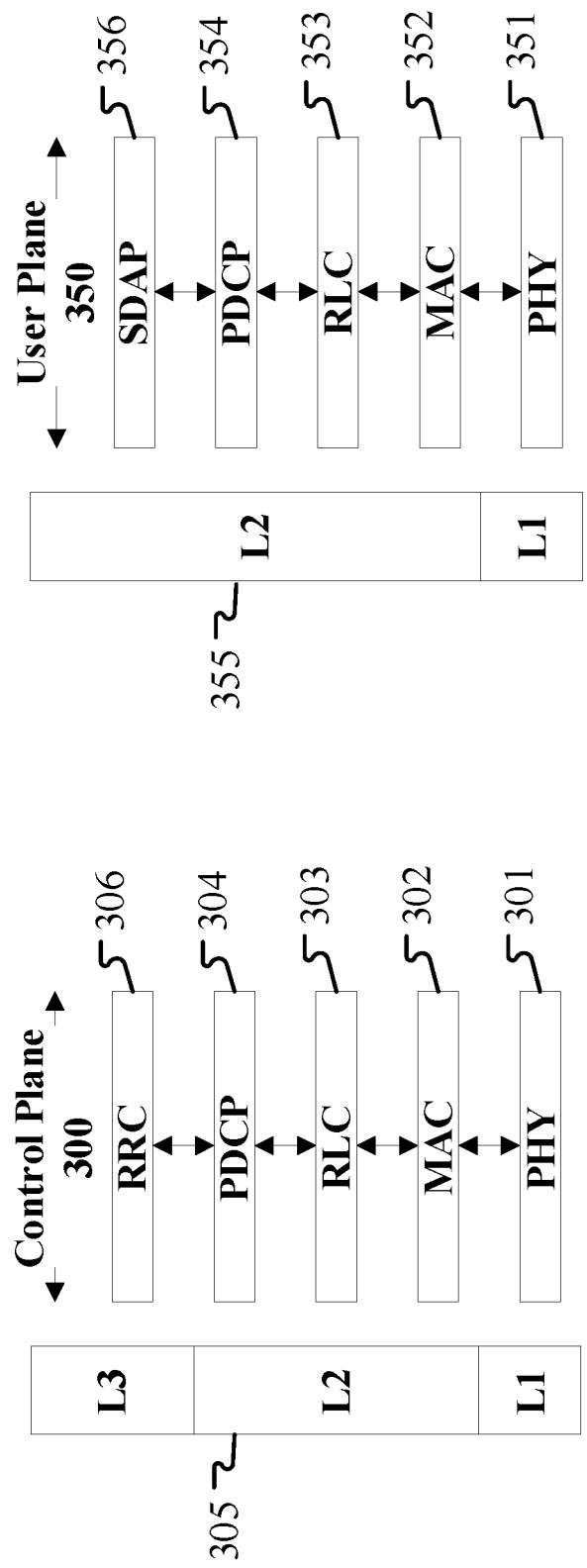
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB, or, satellite or aircraft in NTN) and a second communication node (gNB, UE, or, satellite or aircraft in NTN), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for first communication node handover between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the first communication node and the second communication node. The radio protocol architecture in the user plane 350 comprises the L1 layer and the L2 layer. In the user plane 350, the radio protocol architecture used for the first communication node and the second communication node in a physical layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher layer packet to reduce radio transmission overhead. The L2 layer 355 in the user plane 350 also comprises a Service Data Adaptation Protocol (SDAP) sublayer 356, which is in charge of QoS stream and Data Radio Bearer (DRB), so as to support diversified traffics. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first communication node in the present disclosure.

In one embodiment, the radio protocol architecture in FIG. 3 is applicable to the second communication node in the present disclosure.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the first radio signal in the present disclosure is generated by the MAC 302 or the MAC 352.

In one embodiment, the first radio signal in the present disclosure is generated by the PHY 301 or the PHY 351.

In one embodiment, the first-type signaling in the present disclosure is generated by the RRC 306.

In one embodiment, the first-type signaling in the present disclosure is generated by the MAC 302 or the MAC 352.

In one embodiment, the first-type signaling in the present disclosure is generated by the PHY 301 or the PHY 351.

In one embodiment, the second information in the present disclosure is generated by the RRC 306.

In one embodiment, the second information in the present disclosure is generated by the MAC 302 or the MAC 352.

In one embodiment, the second information in the present disclosure is generated by the PHY 301 or the PHY 351.

In one embodiment, the second radio signal in the present disclosure is generated by the RRC 306.

In one embodiment, the second radio signal in the present disclosure is generated by the MAC 302 or the MAC 352.

In one embodiment, the second radio signal in the present disclosure is generated by the PHY 301 or the PHY 351.

In one embodiment, the third information in the present disclosure is generated by the RRC 306.

In one embodiment, the third information in the present disclosure is generated by the MAC 302 or the MAC 352.

In one embodiment, the third information in the present disclosure is generated by the PHY 301 or the PHY 351.

In one embodiment, the third radio signal in the present disclosure is generated by the RRC 306.

In one embodiment, the third radio signal in the present disclosure is generated by the MAC 302 or the MAC 352.

In one embodiment, the third radio signal in the present disclosure is generated by the PHY 301 or the PHY 351.

In one embodiment, the fourth information in the present disclosure is generated by the RRC 306.

In one embodiment, the fourth information in the present disclosure is generated by the MAC 302 or the MAC 352.

In one embodiment, the fourth information in the present disclosure is generated by the PHY 301 or the PHY 351.

Embodiment 4

Figure 4:
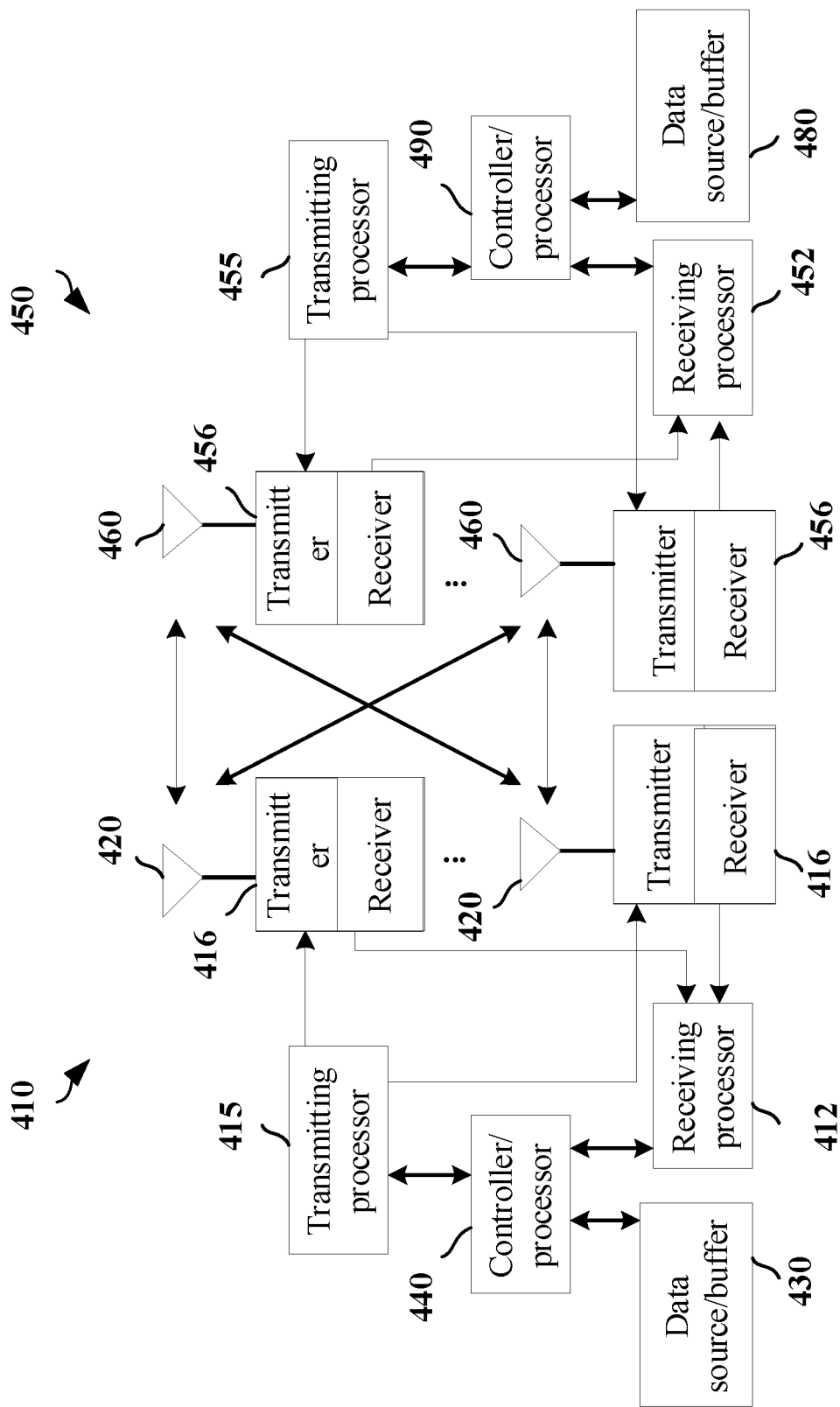
FIG. 4 illustrates a schematic diagram of a first communication node and a second communication node according to one embodiment of the present disclosure.

Embodiment 4 illustrates a schematic diagram of a first communication node and a second communication node according to the present disclosure, as shown in FIG. 4.

The first communication node 450 comprises a controller/processor 490, a data source/buffer 480, a receiving processor 452, a transmitter/receiver 456 and a transmitting processor 455, wherein the transmitter/receiver 456 comprises an antenna 460. The data source/buffer 480 provides a higher layer packet to the controller/processor 490, the controller/processor 490 provides header compression and decompression, encryption and decryption, packet segmentation and reordering as well as multiplexing and demultiplexing between a logical channel and a transport channel so as to implement protocols for the L2 layer or above used for user plane and control plane. The higher layer packet may comprise data or control information, such as DL-SCH or UL-SCH or SL-SCH. The transmitting processor 455 provides various signal transmitting processing functions used for the L1 layer (i.e., PHY), including coding, interleaving, scrambling, modulating, power control/allocation, precoding and physical layer control signaling generation. The receiving processor 452 provides various signaling receiving processing functions used for the L1 layer (i.e., PHY), including decoding, de-interleaving, de-scrambling, demodulating, de-precoding and physical layer control signaling extraction. The transmitter 456 is configured to convert a baseband signal provided by the transmitting processor 455 into a radio frequency (RF) signal to be transmitted via the antenna 460. The receiver 456 converts the RF signal received via the antenna 460 into a baseband signal and provides the baseband signal to the receiving processor 452.

The second communication node 410 may comprise a controller/processor 440, a data source/buffer 430, a receiving processor 412, a transmitter/receiver 416 and a transmitting processor 415, wherein the transmitter/receiver 416 comprises an antenna 420. The data source/buffer 430 provides a higher-layer packet to the controller/processor 440; the controller/processor 440 provides header compression and decompression, encryption and decryption, packet segmentation and reordering and multiplexing and demultiplexing between a logical channel and a transport channel so as to implement the L2 protocols for a user plane and a control plane. The higher layer packet may comprise data or control information, such as DL-SCH or UL-SCH or SL-SCH. The transmitting processor 415 provides various signal transmitting processing functions used for the L1 layer (i.e., PHY), including coding, interleaving, scrambling, modulating, power control/allocation, precoding and physical layer control signaling (including synchronization signal and reference signal) generation. The receiving processor 412 provides various signaling receiving processing functions used for the L1 layer (i.e., PHY), including decoding, de-interleaving, de-scrambling, demodulating, de-precoding and physical layer control signaling extraction. The transmitter 416 is configured to convert a baseband signal provided by the transmitting processor 415 into a radio frequency (RF) signal to be transmitted via the antenna 420. The receiver 416 converts the RF signal received via the antenna 420 into a baseband signal and provides the baseband signal to the receiving processor 412.

In Downlink (DL) transmission, a higher-layer packet, such as first information, second information, and a third radio signal and higher-layer information comprised in a first-type signaling of the present disclosure, is provided to the controller/processor 440. The controller/processor 440 implements the functionality of the L2 layer and above layers. In DL, the controller/processor 440 provides header compression, encryption, packet segmentation and reordering, multiplexing between a logical channel and a transport channel, as well as radio resources allocation of the first communication node 450 based on various priorities. The controller/processor 440 is also in charge of HARQ operation, retransmission of a lost packet and a signaling to the first communication node 450, for instance, the first information, the second information, the third radio signal and higher layer information comprised in the first-type signaling of the present disclosure, if any, are all generated in the controller/processor 440. The transmitting processor 415 provides various signal-processing functions for the L1 layer (that is, PHY), including coding, interleaving, scrambling, modulation, power control/allocation, precoding and generation of physical layer control signaling. The generation of the first information, the second information, the third radio signal and higher layer information comprised in the first-type signaling of the present disclosure is completed in the transmitting processor 415. Modulation symbols generated are divided into parallel streams and each stream is mapped onto a corresponding subcarrier and/or a multicarrier symbol, which is later mapped from the transmitting processor 415 to the antenna 420 via the antenna 420 in the form of a radio frequency signal. At the receiving side, each receiver 456 receives the radio frequency signal via a corresponding antenna 460, and recovers baseband information modulated onto a radio frequency carrier and provides the baseband information to the receiving processor 452. The receiving processor 452 provides various signal receiving functions for the L1 layer. The functions include receiving the first information, the second information, the third radio signal and physical layer signal of the first-type signaling of the present disclosure. Multicarrier symbols in multicarrier symbol streams are modulated based on varied modulation schemes (i.e., BPSCK, QPSK), and are then descrambled, decoded and de-interleaved to recover data or control signal transmitted by the second communication node 410 on a physical channel. And the data and control signal are provided to the controller/processor 490. The controller/processor 490 is in charge of the L2 layer and above layers. The controller/processor 490 interprets the first information, the second information, the third radio signal and higher layer information comprised in the first-type signaling of the present disclosure, if any. The controller/processor 490 may be associated with the buffer 480 that stores program codes and data. The buffer 480 can be called a computer readable medium.

In Uplink (UL) transmission, the data source/buffer 480 is used for providing higher-layer data to the controller/processor 490. The data source/buffer 480 represents the L2 layer and all protocol layers above the L2 layer. The controller/processor 490 provides header compression, encryption, packet segmentation and reordering as well as multiplexing between a logical channel and a transport channel based on radio resources allocation of the second communication node 410 so as to implement L2 layer protocols used for the user plane and the control plane. The controller/processor 490 is also in charge of HARQ operation, retransmission of a lost packet, and a signaling to the second communication node 410. The first radio signal and the second radio signal are generated in the data source/buffer 480 or in the controller/processor 490. The transmitting processor 455 provides various signal transmitting processing functions used for the L1 layer (that is, PHY). A physical layer signal of the first radio signal and a physical layer signal of the second radio signal of the present disclosure are generated in the transmitting processor 455. Signal transmitting processing functions include coding and interleaving so as to promote Forward Error Correction (FEC) at the UE 450 and modulation of baseband signal based on each modulation scheme (e.g., BPSK, QPSK). Modulated signals are divided into parallel streams and each stream is mapped onto a corresponding multicarrier subcarrier and/or multicarrier symbol, which is later mapped from the transmitting processor 455 to the antenna 460 via the transmitter 456 in the form of a radio frequency signal. The receiver 416 receives the radio frequency signal via a corresponding antenna 420. Each receiver 416 recovers baseband information modulated onto radio frequency carrier and provides the baseband information to the receiving processor 412. The receiving processor 412 provides various signal receiving processing functions used for the L1 layer (that is, PHY), including receiving a physical layer signal of the first radio signal and the second radio signal of the present disclosure. The signal receiving processing functions also include acquiring multicarrier symbol streams, demodulating multicarrier symbols in the multicarrier symbol streams based on each modulation scheme (e.g., BPSK, QPSK), and decoding and de-interleaving to recover data and/or control signal originally transmitted by the first communication node 450 on a physical channel. After that data and/or control signal are provided to the controller/processor 440. The controller/processor 440 implements the functionality of the L2 layer, including interpreting information carried by the first radio signal and the second radio signal of the present disclosure. The controller/processor 440 can be associated with the buffer 430 that stores program codes and data. The buffer 430 can be a computer readable medium.

In one embodiment, the first communication node 450 comprises at least one processor and at least one memory. The at least one memory comprises computer program codes; the at least one memory and the computer program codes are configured to be used in collaboration with the at least one processor. The first communication node 450 at least receives first information, transmits a first radio signal, and monitors a first-type signaling in a first time window; herein, an end time for a transmission of the first radio signal is used for determining a start of the first time window, time domain resource occupied by the first radio signal is used for determining a first characteristic identity; the first characteristic identity is one of M characteristic identities, M is a positive integer greater than 1, the first information is used for determining the M characteristic identities; the first-type signaling carries one of the M characteristic identities, the first communication node determines a characteristic identity carried by the first-type signaling out of the M characteristic identities through blind detection.

In one embodiment, the first communication node 450 comprises a memory that stores a computer readable instruction program. The computer readable instruction program generates an action when executed by at least one processor. The action includes receiving first information, transmitting a first radio signal, and monitoring a first-type signaling in a first time window; herein, an end time for a transmission of the first radio signal is used for determining a start of the first time window, time domain resource occupied by the first radio signal is used for determining a first characteristic identity; the first characteristic identity is one of M characteristic identities, M is a positive integer greater than 1, the first information is used for determining the M characteristic identities; the first-type signaling carries one of the M characteristic identities, the first communication node determines a characteristic identity carried by the first-type signaling out of the M characteristic identities through blind detection.

In one embodiment, the second communication node 410 comprises at least one processor and at least one memory. The at least one memory comprises computer program codes. The at least one memory and the computer program codes are configured to be used in collaboration with the at least one processor. The second communication node 410 at least transmits first information; receives a first radio signal; and transmits a first-type signaling in a first time window; herein, an end time for a transmission of the first radio signal is used for determining a start of the first time window, time domain resource occupied by the first radio signal is used for determining a first characteristic identity; the first characteristic identity is one of M characteristic identities, M is a positive integer greater than 1, the first information is used for determining the M characteristic identities; the first-type signaling carries one of the M characteristic identities, a transmitter of the first radio signal determines a characteristic identity carried by the first-type signaling out of the M characteristic identities through blind detection.

In one embodiment, the second communication node 410 comprises a memory that stores a computer readable instruction program. The computer readable instruction program generates an action when executed by at least one processor. The action includes transmitting first information; receiving a first radio signal; and transmitting a first-type signaling in a first time window; herein, an end time for a transmission of the first radio signal is used for determining a start of the first time window, time domain resource occupied by the first radio signal is used for determining a first characteristic identity; the first characteristic identity is one of M characteristic identities, M is a positive integer greater than 1, the first information is used for determining the M characteristic identities; the first-type signaling carries one of the M characteristic identities, a transmitter of the first radio signal determines a characteristic identity carried by the first-type signaling out of the M characteristic identities through blind detection.

In one embodiment, the first communication node 450 is a UE.

In one embodiment, the first communication node 450 is a UE supporting large-delay-difference.

In one embodiment, the first communication node 450 is a UE supporting NTN.

In one embodiment, the first communication node 450 is an aircraft.

In one embodiment, the second communication node 410 is a base station.

In one embodiment, the second communication node 410 is a base station supporting large-delay-difference.

In one embodiment, the second communication node 410 is a base station supporting NTN.

In one embodiment, the second communication node 410 is an flight platform.

In one embodiment, the receiver 456 (comprising the antenna 460), the receiving processor 452 and the controller/processor 490 are used in the present disclosure for receiving the first information.

In one embodiment, the transmitter 456 (comprising the antenna 460), the transmitting processor 455 and the controller/processor 490 are used in the present disclosure for transmitting the first radio signal.

In one embodiment, the receiver 456 (comprising the antenna 460), the receiving processor 452 and the controller/processor 490 are used in the present disclosure for monitoring the first-type signaling.

In one embodiment, the receiver 456 (comprising the antenna 460), the receiving processor 452 and the controller/processor 490 are used in the present disclosure for receiving the second information.

In one embodiment, the transmitter 456 (comprising the antenna 460), the transmitting processor 455 and the controller/processor 490 are used in the present disclosure for transmitting the second radio signal.

In one embodiment, the receiver 456 (comprising the antenna 460), the receiving processor 452 and the controller/processor 490 are used in the present disclosure for receiving the third radio signal.

In one embodiment, the transmitter 416 (comprising the antenna 420), the transmitting processor 415 and the controller/processor 440 are used in the present disclosure for transmitting the first information.

In one embodiment, the receiver 416 (comprising the antenna 420), the receiving processor 412, and the controller/processor 440 are used in the present disclosure for receiving the first radio signal.

In one embodiment, the transmitter 416 (comprising the antenna 420), the transmitting processor 415 and the controller/processor 440 are used in the present disclosure for transmitting the first-type signaling.

In one embodiment, the transmitter 416 (comprising the antenna 420), the transmitting processor 415 and the controller/processor 440 are used in the present disclosure for transmitting the second information.

In one embodiment, the receiver 416 (comprising the antenna 420), the receiving processor 412, and the controller/processor 440 are used in the present disclosure for receiving the second radio signal.

In one embodiment, the transmitter 416 (comprising the antenna 420), the transmitting processor 415 and the controller/processor 440 are used in the present disclosure for transmitting the third radio signal.

Embodiment 5

Figure 5:
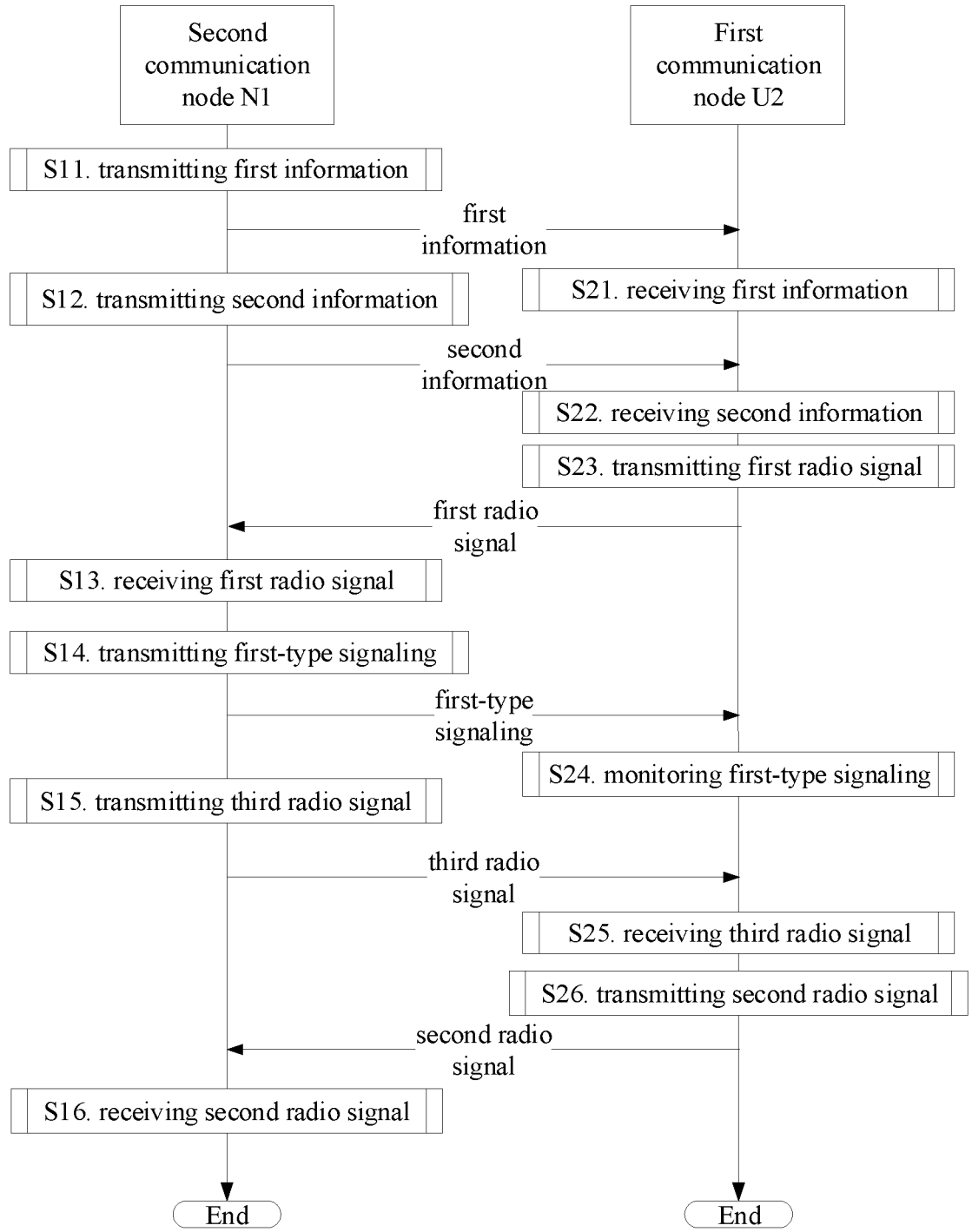
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a second communication node N1 is a maintenance base station for a serving cell of a first communication node U2. It should be specifically noted that the sequence of examples do not restrict the order of signal transmission or implementations in the present disclosure.

The second communication node N1 transmits first information in step S11, transmits second information in step S12, receives a first radio signal in step S13, transmits a first-type signaling in step S14, transmits a third radio signal in step S15, and receives a second radio signal in step S16.

The first communication node U2 receives first information in step S21, receives second information in step S22, transmits a first radio signal in step S23, monitors a first-type signaling in step S24, receives a third radio signal in step S25, and transmits a second radio signal in step S26.

In Embodiment 5, an end time for a transmission of the first radio signal is used for determining a start of the first time window of the present disclosure, time domain resource occupied by the first radio signal is used for determining a first characteristic identity; the first characteristic identity is one of M characteristic identities, M is a positive integer greater than 1, the first information in the present disclosure is used for determining the M characteristic identities; the first-type signaling in the present disclosure carries one of the M characteristic identities, the first communication node in the present disclosure determines a characteristic identity carried by the first-type signaling out of the M characteristic identities through blind detection; the second information in the present disclosure is used for determining a length of a time interval between the start of the first time window and the end time for the transmission of the first radio signal; the second radio signal in the present disclosure carries third information, the third information is used for indicating a position of the time domain resource occupied by the first radio signal in time domain, a start time for a transmission of the second radio signal is later than the end time for the transmission of the first radio signal; the first-type signaling detected in the first time window is used for determining time-frequency resources occupied by the third radio signal; the third radio signal carries fourth information, the fourth information is used for determining a first timing advance, the first timing advance is used for determining a transmission timing of a radio signal transmitted later than the first radio signal.

In one embodiment, the second information is transmitted via a higher layer signaling.

In one embodiment, the second information is transmitted via a physical layer signaling.

In one embodiment, the second information comprises all or part of a higher layer signaling.

In one embodiment, the second information comprises all or part of a physical layer signaling.

In one embodiment, the second information is transmitted through a Physical Broadcast Channel (PBCH).

In one embodiment, the second information comprises one or more fields of a Master Information Block (MIB).

In one embodiment, the second information is transmitted through a Downlink Shared Channel (DL-SCH).

In one embodiment, the second information is transmitted through a PDSCH.

In one embodiment, the second information comprises one or more fields of a System Information Block (SIB).

In one embodiment, the second information comprises one or more fields of a piece of Remaining System Information (RMSI).

In one embodiment, the second information comprises all or part of an RRC signaling.

In one embodiment, the second information is broadcast.

In one embodiment, the second information is unicast.

In one embodiment, the second information is cell-specific.

In one embodiment, the second information is UE-specific.

In one embodiment, the second information is transmitted through a PDCCH.

In one embodiment, the second information comprises all or part of fields of a DCI signaling.

In one embodiment, the above phrase that the second information is used for determining a length of a time interval between the start of the first time window and the end time for the transmission of the first radio signal means that the second information is used by the first communication node for determining the length of the time interval between the start of the first time window and the end time for the transmission of the first radio signal.

In one embodiment, the above phrase that the second information is used for determining a length of a time interval between the start of the first time window and the end time for the transmission of the first radio signal means that the second information is used for directly indicating the length of the time interval between the start of the first time window and the end time for the transmission of the first radio signal.

In one embodiment, the above phrase that the second information is used for determining a length of a time interval between the start of the first time window and the end time for the transmission of the first radio signal means that the second information is used for indirectly indicating the length of the time interval between the start of the first time window and the end time for the transmission of the first radio signal.

In one embodiment, the above phrase that the second information is used for determining a length of a time interval between the start of the first time window and the end time for the transmission of the first radio signal means that the second information is used for explicitly indicating the length of the time interval between the start of the first time window and the end time for the transmission of the first radio signal.

In one embodiment, the above phrase that the second information is used for determining a length of a time interval between the start of the first time window and the end time for the transmission of the first radio signal means that the second information is used for implicitly indicating the length of the time interval between the start of the first time window and the end time for the transmission of the first radio signal.

In one embodiment, the above phrase that the second information is used for determining a length of a time interval between the start of the first time window and the end time for the transmission of the first radio signal means that the second information is used for indicating whether the length of the time interval between the start of the first time window and the end time for the transmission of the first radio signal is equal to 0.

In one embodiment, the above phrase that the second information is used for determining a length of a time interval between the start of the first time window and the end time for the transmission of the first radio signal means that the second information is used for indicating a minimum value of the length of the time interval between the start of the first time window and the end time for the transmission of the first radio signal.

In one embodiment, the above phrase that the second information is used for determining a length of a time interval between the start of the first time window and the end time for the transmission of the first radio signal means that the second information is used for indicating a target time length, the length of the time interval between the start of the first time window and the end time for the transmission of the first radio signal is equal to a sum of the target time length and a target offset length, where the target offset length is pre-defined or configurable.

In one embodiment, the above phrase that the second information is used for determining a length of a time interval between the start of the first time window and the end time for the transmission of the first radio signal means that the second information is used for indicating a height of a transmitter of the second information, and the height of the transmitter of the second information is used for determining the length of the time interval between the start of the first time window and the end time for the transmission of the first radio signal.

In one embodiment, the above phrase that the second information is used for determining a length of a time interval between the start of the first time window and the end time for the transmission of the first radio signal means that the second information is used for indicating a reference Round Trip Time (RTT) delay when a transmitter of the second information arrives at the first communication node; the reference RTT delay is used for determining the length of the time interval between the start of the first time window and the end time for the transmission of the first radio signal.

In one embodiment, the above phrase that the second information is used for determining a length of a time interval between the start of the first time window and the end time for the transmission of the first radio signal means that the second information is used for indicating a height of a transmitter of the second information, and the length of the time interval between the start of the first time window and the end time for the transmission of the first radio signal is positively linearly with the height of the transmitter of the second information.

In one embodiment, the above phrase that the second information is used for determining a length of a time interval between the start of the first time window and the end time for the transmission of the first radio signal means that the second information is used for indicating a reference Round Trip Time (RTT) delay when a transmitter of the second information arrives at the first communication node; the length of the time interval between the start of the first time window and the end time for the transmission of the first radio signal is positively linearly with the reference RTT delay.

In one embodiment, the above phrase that the second information is used for determining a length of a time interval between the start of the first time window and the end time for the transmission of the first radio signal means that the second information is used for indicating orbit information of a transmitter of the second information, and the orbit information of the transmitter of the second information is used for determining the length of the time interval between the start of the first time window and the end time for the transmission of the first radio signal.

In one embodiment, the above phrase that the second information is used for determining a length of a time interval between the start of the first time window and the end time for the transmission of the first radio signal means that the second information is used for indicating ephemeris information of a transmitter of the second information, and the ephemeris information of the transmitter of the second information is used for determining the length of the time interval between the start of the first time window and the end time for the transmission of the first radio signal.

In one embodiment, the above phrase that the first information is used for determining a length of the first time window means that the first information is used by the first communication node of the present disclosure for determining the length of the first time window.

In one embodiment, the above phrase that the first information is used for determining a length of the first time window means that the first information is used for determining the first time length in the present disclosure, while the length of the first time window is related to the first time length in the present disclosure.

In one embodiment, the above phrase that the first information is used for determining a length of the first time window means that the first information is used for directly indicating the length of the first time window.

In one embodiment, the above phrase that the first information is used for determining a length of the first time window means that the first information is used for indirectly indicating the length of the first time window.

In one embodiment, the above phrase that the first information is used for determining a length of the first time window means that the first information is used for explicitly indicating the length of the first time window.

In one embodiment, the above phrase that the first information is used for determining a length of the first time window means that the first information is used for implicitly indicating the length of the first time window.

In one embodiment, the above phrase that the first information is used for determining a length of the first time window means that the first information is used for determining the first time length in the present disclosure, the length of the first time window is equal to a sum of a basic time length and the first time length; the basic time length is fixed or the basic time length is configurable.

In one embodiment, the above phrase that the first information is used for determining a length of the first time window means that the first information is used for determining the first time length in the present disclosure, the length of the first time window is equal to a sum of a basic time length and Q times of the first time length; the basic time length is fixed or the basic time length is configurable; the Q is a positive integer greater than 1.

Embodiment 6

Figure 6:
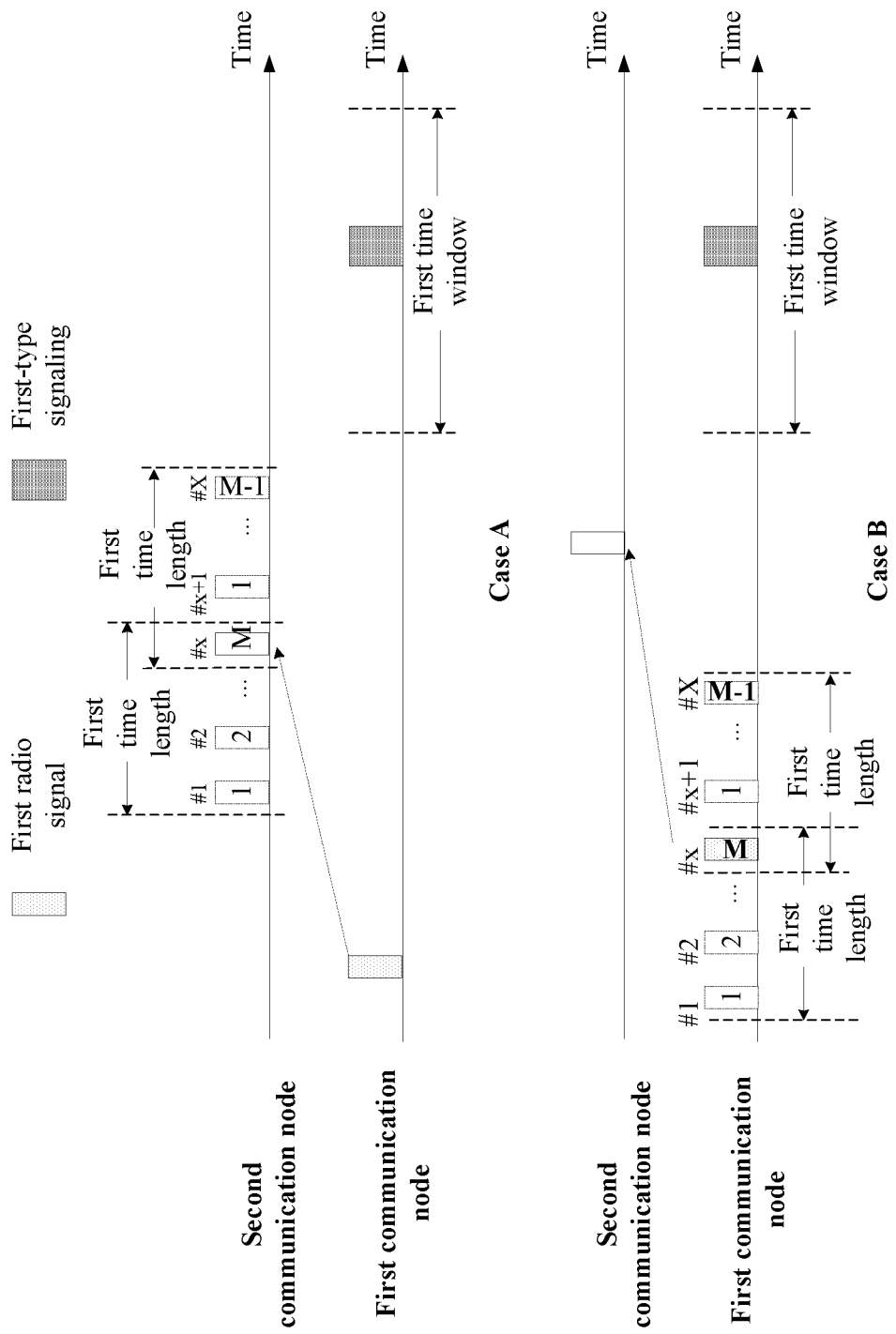
FIG. 6 illustrates a schematic diagram of X time domain resource blocks according to one embodiment of the present disclosure.

Embodiment 6 illustrates a schematic diagram of X time domain resource blocks according to one embodiment of the present disclosure, as shown in FIG. 6. In FIG. 6, the horizontal axis represents time; a slash-filled box represents a first radio signal transmitted by the first communication node, and a cross-filled box represents a first-type signaling monitored by the first communication node; in Case A, each box at the second communication node represents one of X time domain resource blocks, the X time domain resource blocks are time domain resource blocks that the first communication node considers likely to be occupied by the first radio signal at the second communication node side; in Case B, a box at the second communication node represents a first radio signal received by the second communication node, X time domain resource blocks are time domain resource blocks that the second communication node considers likely to be occupied by the first radio signal transmitted by the first communication node side.

In Embodiment 6, the first information in the present disclosure is used for determining a first time length, the time domain resource occupied by the first radio signal in the present disclosure and the first time length are used for determining X time domain resource blocks, the X time domain resource blocks are divided into M time domain resource block groups, time-domain positions of the M time domain resource block groups are respectively used for determining the M characteristic identities in the present disclosure, the X is a positive integer no less than the M.

In one embodiment, the above phrase that the first information is used for determining a first time length means that the first information is used by the first communication node of the present disclosure for determining the first time length In one embodiment, the above phrase that the first information is used for determining a first time length means that the first information is used for directly indicating the first time length.

In one embodiment, the above phrase that the first information is used for determining a first time length means that the first information is used for indirectly indicating the first time length.

In one embodiment, the above phrase that the first information is used for determining a first time length means that the first information is used for explicitly indicating the first time length.

In one embodiment, the above phrase that the first information is used for determining a first time length means that the first information is used for implicitly indicating the first time length.

In one embodiment, the above phrase that the first information is used for determining a first time length means that the first information comprises ephemeris information of the second communication node of the present disclosure, the ephemeris information of the second communication node is used for determining the first time length.

In one embodiment, the above phrase that the first information is used for determining a first time length means that the first information comprises orbit information of the second communication node of the present disclosure, the orbit information of the second communication node is used for determining the first time length.

In one embodiment, the above phrase that the first information is used for determining a first time length means that the first information comprises coverage information of the second communication node of the present disclosure, the coverage information of the second communication node is used for determining the first time length.

In one embodiment, the time domain resource occupied by the first radio signal is a time domain resource occupied by one time domain resource block of the X time domain resource blocks.

In one embodiment, the X is equal to the M.

In one embodiment, the X is greater than the M.

In one embodiment, any two time domain resource blocks of the X time domain resource blocks are different.

In one embodiment, each of the X time domain resource blocks is a Physical Random Access Channel Occasion in time domain.

In one embodiment, each of the X time domain resource blocks occupies contiguous time domain resources.

In one embodiment, there are two time domain resource blocks out of the X time domain resource blocks respectively belong to two different system frames.

In one embodiment, any two of time domain resource blocks of the X time domain resource blocks belong to a same system frame, the X being equal to the M.

In one embodiment, there are two time domain resource blocks out of the X time domain resource blocks having a same index in two different system frames to which the two time domain resource blocks respectively belong.

In one embodiment, any two time domain resource blocks out of the X time domain resource blocks have different indices in two different system frames to which the two time domain resource blocks respectively belong.

In one embodiment, the above phrase that the time domain resource occupied by the first radio signal and the first time length are used for determining X time domain resource blocks means that the time domain resource occupied by the first radio signal and the first time length are jointly used for determining X time domain resource blocks.

In one embodiment, the above phrase that the time domain resource occupied by the first radio signal and the first time length are used for determining X time domain resource blocks means that the time domain resource occupied by the first radio signal and the first time length are used by the first communication node for determining X time domain resource blocks.

In one embodiment, the above phrase that the time domain resource occupied by the first radio signal and the first time length are used for determining X time domain resource blocks means that the time domain resource occupied by the first radio signal and the first time length are jointly used for determining a target time window, any one of the X time domain resource blocks is a time domain resource block occupied by a PRACH Occasion in the first target time window.

In one embodiment, the above phrase that the time domain resource occupied by the first radio signal and the first time length are used for determining X time domain resource blocks means that any one of the X time domain resource blocks is a time domain resource block occupied by a PRACH Occasion in the first target time window; a length of a time interval between a start of the target time window and an end time for the time domain resource occupied by the first radio signal is equal to the first time length, and length of a time interval between a start time for the time domain resource occupied by the first radio signal and an end of the target time window is equal to the first time length.

In one embodiment, the above phrase that the time domain resource occupied by the first radio signal and the first time length are used for determining X time domain resource blocks means that any one of the X time domain resource blocks is a time domain resource block occupied by a PRACH Occasion in the first target time window; a length of a time interval between a start of the target time window and a start time for the time domain resource occupied by the first radio signal is equal to the first time length, and length of a time interval between an end time for the time domain resource occupied by the first radio signal and an end of the target time window is equal to the first time length.

In one embodiment, any two time domain resource block groups of the M time domain resource block groups comprise equal numbers of time domain resource blocks.

In one embodiment, there are two time domain resource block groups of the M time domain resource block groups that comprise unequal number of time domain resource blocks.

In one embodiment, a first time domain resource block group is one of the M time domain resource block groups, the first time domain resource block group comprises more than one time domain resource block, earliest OFDM symbols respectively comprised by any two time domain resource blocks of the first time domain resource block group have a same index in respective slots to which the earliest OFDM symbols belong.

In one embodiment, a first time domain resource block group is one of the M time domain resource block groups, the first time domain resource block group comprises more than one time domain resource block, slots to which earliest OFDM symbols respectively comprised by any two time domain resource blocks of the first time domain resource block group respectively belong have a same index in a system frame.

In one embodiment, the practice that time-domain positions of the M time domain resource block groups are respectively used for determining the M characteristic identities is realized through the following formula:

$$RA\text{-}RNTI = 1 + s\_id + 14 \times t\_id + 14 \times 80 \times f\_id + 14 \times 80 \times 8 \times ul\_carrier\_id$$

where RA-RNTI represents one of the M characteristic identities; s_id represents an index of an earliest multicarrier symbol (OFDM symbol) in time domain comprised in one of the M time domain resource block groups (0≤s_id<14); t_id represents an index of a slot in a system frame to which an earliest multicarrier symbol (OFDM symbol) in time domain comprised in one of the M time domain resource block groups belongs (0≤t_id<80); f_id represents an index of a frequency domain resource occupied by the first radio signal (0≤f_id<8); ul_carrier_id represents an identity of a carrier to which a frequency domain resource occupied by the first radio signal belongs.

In one embodiment, the practice that time-domain positions of the M time domain resource block groups are respectively used for determining the M characteristic identities is realized through the following formula:

$$RA\text{-}RNTI = 1 + s\_id + 14 \times t\_id + 14 \times 80 \times f\_id + 14 \times 80 \times 8 \times ul\_carrier\_id$$

Where RA-RNTI represents one of the M characteristic identities; s_id represents an index of an earliest multicarrier symbol (OFDM symbol) in time domain comprised in one of the M time domain resource block groups (0≤s_id<14); t_id represents an index of a slot in a system frame to which an earliest multicarrier symbol (OFDM symbol) in time domain comprised in one of the M time domain resource block groups belongs (0≤t_id<80); f_id represents an index of a frequency domain resource occupied by the first radio signal (0≤f_id<8); ul_carrier_id represents an identity of a carrier to which a frequency domain resource occupied by the first radio signal belongs; all time domain resource blocks of any time domain resource block group of the M time domain resource block groups are of the same s_id and t_id.

In one embodiment, the above phrase that time-domain positions of the M time domain resource block groups are respectively used for determining the M characteristic identities includes the meaning that time-domain positions of the M time domain resource block groups are respectively used by the first communication node of the present disclosure for determining the M characteristic identities In one embodiment, the above phrase that time-domain positions of the M time domain resource block groups are respectively used for determining the M characteristic identities includes the meaning that the M time domain resource block groups respectively correspond to the M characteristic identities, any characteristic identity of the M characteristic identities is linear with an earliest OFDM symbol comprised by a time domain resource block of a corresponding time domain resource block group.

In one embodiment, the above phrase that time-domain positions of the M time domain resource block groups are respectively used for determining the M characteristic identities includes the meaning that the M time domain resource block groups respectively correspond to the M characteristic identities, any characteristic identity of the M characteristic identities is linear with an index of a slot to which an earliest OFDM symbol comprised by a time domain resource block of a corresponding time domain resource block group belong in a system frame.

Embodiment 7

Figure 7:
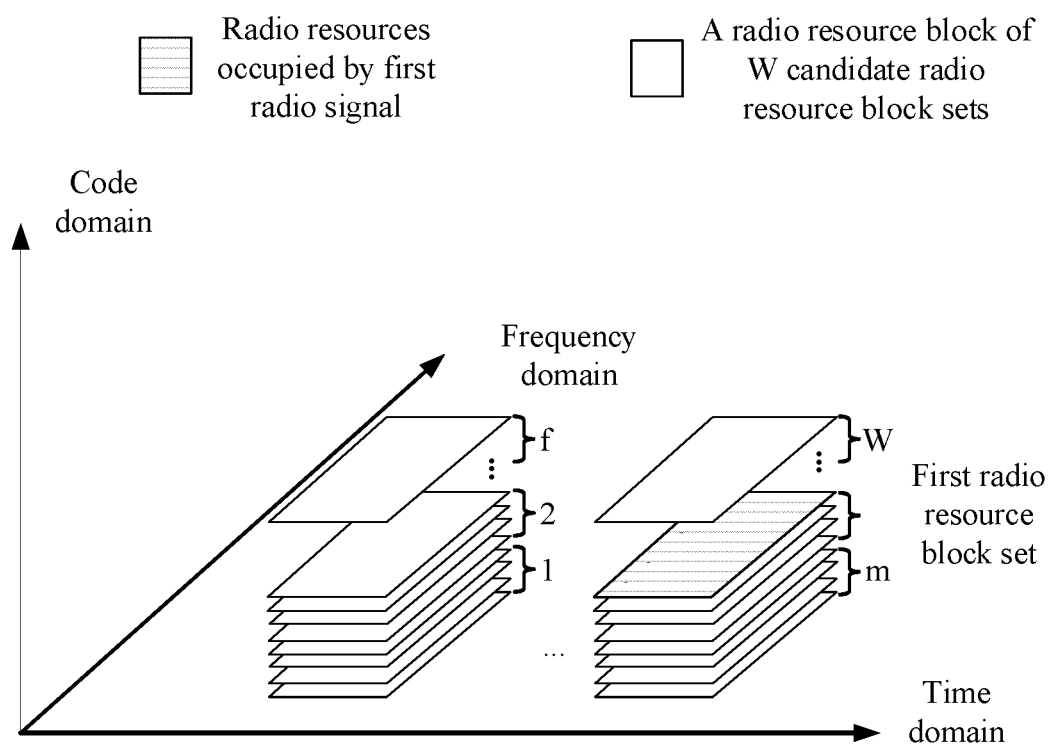
FIG. 7 illustrates a schematic diagram of W candidate radio resource block sets according to one embodiment of the present disclosure.

Embodiment 7 illustrates a schematic diagram of W candidate radio resource block sets according to one embodiment of the present disclosure, as shown in FIG. 7. In FIG. 7, the horizontal (or lateral) axis represents time domain, the longitudinal axis represents frequency domain, while the vertical axis represents code domain. A square with fillings represents a first radio resource block, each blank square represents a radio resource block of W candidate radio resource block sets other than radio resources occupied by the first radio signal; numbers "1,2, . . . , f, . . . , m, m+1 . . . , and W" in FIG. 7 respectively represent indices of the W candidate radio resource block sets.

In Embodiment 7, radio resources occupied by the first radio signal in the presents disclosure belong to a radio resource block in a first radio resource block set, the first radio resource block set comprises a positive integer number of radio resource blocks; the first communication node in the present disclosure selects at random the radio resources occupied by the first radio signal from the first radio resource block set; the first radio resource block set is one of W candidate radio resource block sets, the W being greater than 1; a position of the first radio resource block set among the W candidate radio resource block sets is used for indicating a positioning capability of the first communication node.

In one embodiment, the W is equal to 2.

In one embodiment, the W is greater than 2.

In one embodiment, the first radio resource block set comprises more than 1 radio resource block.

In one embodiment, the first radio resource block set only comprises the radio resource block occupied by the first radio signal.

In one embodiment, the first radio resource block set comprises more than 1 radio resource block, and any two radio resource blocks in the first radio resource block set are different.

In one embodiment, each radio resource block of the W candidate radio resource block sets occupies contiguous time-frequency resources.

In one embodiment, any two candidate radio resource block sets of the W candidate radio resource block sets are different.

In one embodiment, any two candidate radio resource block sets of the W candidate radio resource block sets are orthogonal.

In one embodiment, there does not exist any radio resource block belonging to two of the W candidate radio resource block sets spontaneously.

In one embodiment, radio resources occupied by the first radio signal comprise time-frequency resources and code domain resources.

In one embodiment, radio resources occupied by the first radio signal comprise time-frequency resources and sequence resources.

In one embodiment, radio resources occupied by the first radio signal comprise a characteristic sequence for generating the first radio signal and time-frequency resources occupied by the first radio signal.

In one embodiment, radio resources occupied by the first radio signal only comprise time-frequency resources.

In one embodiment, radio resources occupied by the first radio signal only comprise code domain resources.

In one embodiment, radio resources occupied by the first radio signal only comprise sequence resources.

In one embodiment, radio resources occupied by the first radio signal only comprise a characteristic sequence for generating the first radio signal.

In one embodiment, any radio resource block of the W candidate radio resource block sets comprises time-frequency resources and code domain resources.

In one embodiment, any radio resource block of the W candidate radio resource block sets comprises time-frequency resources and sequence resources.

In one embodiment, any radio resource block of the W candidate radio resource block sets only comprises time-frequency resources.

In one embodiment, any radio resource block of the W candidate radio resource block sets comprises code domain resources.

In one embodiment, any radio resource block of the W candidate radio resource block sets comprises sequence resources.

In one embodiment, the above phrase that a position of the first radio resource block set among the W candidate radio resource block sets is used for indicating a positioning capability of the first communication node means that the position of the first radio resource block set in the W candidate radio resource block sets is used by the first communication node for indicating the positioning capability of the first communication node.

In one embodiment, the above phrase that a position of the first radio resource block set among the W candidate radio resource block sets is used for indicating a positioning capability of the first communication node means that an index of the first radio resource block set in the W candidate radio resource block sets is used for indicating the positioning capability of the first communication node.

In one embodiment, the above phrase that a position of the first radio resource block set among the W candidate radio resource block sets is used for indicating a positioning capability of the first communication node means that an index of the first radio resource block set in the W candidate radio resource block sets is used for indicating whether the first communication node has the positioning capability.

In one embodiment, the above phrase that a position of the first radio resource block set among the W candidate radio resource block sets is used for indicating a positioning capability of the first communication node means that an order of the first radio resource block set in the W candidate radio resource block sets is used for indicating the positioning capability of the first communication node.

In one embodiment, the positioning capability of the first communication node means whether the first communication node supports Global Navigation Satellite System (GNSS).

In one embodiment, the positioning capability of the first communication node means precision of positioning of the first communication node.

In one embodiment, the positioning capability of the first communication node means whether the first communication node supports Global Navigation Satellite System (GNSS) and the type of GNSS when the first communication node supports GNSS.

Embodiment 8

Figure 8:
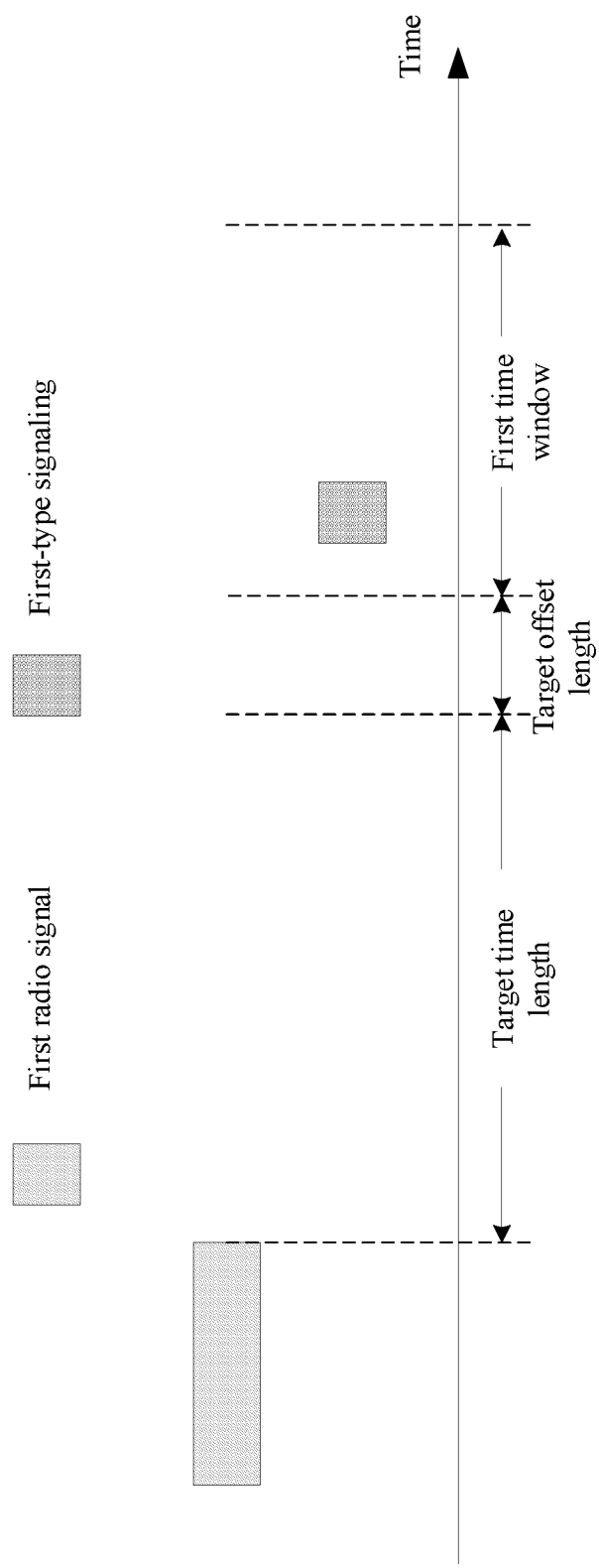
FIG. 8 illustrates a schematic diagram of a relation between a first time window and a first radio signal according to one embodiment of the present disclosure.

Embodiment 8 illustrates a schematic diagram of a relation between a first time window and a first radio signal according to one embodiment of the present disclosure, as shown in FIG. 8. In FIG. 8, the horizontal axis represents time. The square filled with slashes represents a first radio signal, while the square filled with crosses represents a first-type signaling.

In Embodiment 8, the second information in the present disclosure is used for indicating a target time length. A length of a time interval between the start of the first time window and the end time for the transmission of the first radio signal is equal to a sum of the target time length and a target offset length, where the target offset length is pre-defined or configurable.

Embodiment 9

Figure 9:
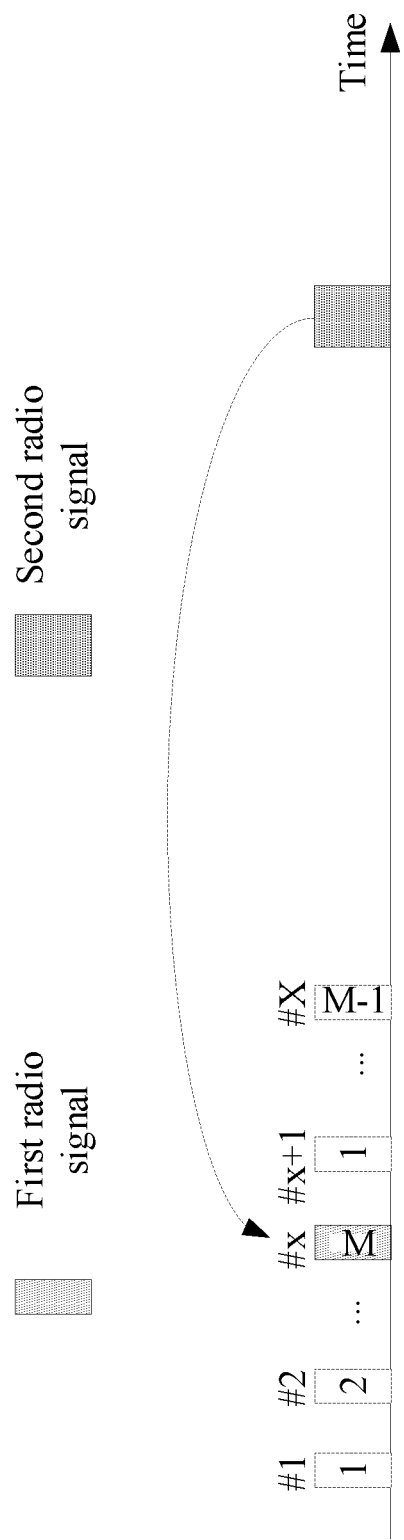
FIG. 9 illustrates a schematic diagram of a relation between a second radio signal and a first radio signal according to one embodiment of the present disclosure.

Embodiment 9 illustrates a schematic diagram of a relation between a second radio signal and a first radio signal according to one embodiment of the present disclosure, as shown in FIG. 9. In FIG. 9, the square filled with slashes represents a first radio signal, while the square filled with crosses represents a second radio signal.

In Embodiment 9, the second radio signal in the present disclosure carries third information, the third information is used for indicating a position of time domain resource occupied by the first radio signal of the present disclosure in time domain; a start time for a transmission of the second radio signal is later than an end time for a transmission of the first radio signal.

In one embodiment, the second radio signal carries a message (Msg)3.

In one embodiment, the second radio signal carries an Msg B.

In one embodiment, the second radio signal is used for random access process.

In one embodiment, the second radio signal carries a retransmission of an Msg3.

In one embodiment, the second radio signal carries a first transmission of an Msg3.

In one embodiment, the second radio signal carries a retransmission of an MsgB.

In one embodiment, the second radio signal carries a first transmission of an MsgB.

In one embodiment, the second radio signal is transmitted through a UL-SCH.

In one embodiment, the second radio signal is transmitted through a PUSCH.

In one embodiment, bits output from LDPC channel coding of a TB is used for generating the first radio signal.

In one embodiment, the third information comprises an Msg3.

In one embodiment, the third information comprises an Msg B.

In one embodiment, the third information is transmitted via a higher layer signaling.

In one embodiment, the third information is transmitted via a physical layer signaling.

In one embodiment, the third information comprises all or part of a higher layer signaling.

In one embodiment, the third information comprises all or part of an RRC signaling.

In one embodiment, the third information comprises all or part of a MAC signaling.

In one embodiment, the third information comprises all or part of a MAC CE.

In one embodiment, the third information comprises all or part of a MAC Header.

In one embodiment, the above phrase that the third information is used for indicating a position of the time domain resource occupied by the first radio signal in time domain means that the third information is used by the first communication node in the present disclosure for indicating a position of the time domain resource occupied by the first radio signal in time domain.

In one embodiment, the above phrase that the third information is used for indicating a position of the time domain resource occupied by the first radio signal in time domain means that the third information is used for directly indicating a position of the time domain resource occupied by the first radio signal in time domain.

In one embodiment, the above phrase that the third information is used for indicating a position of the time domain resource occupied by the first radio signal in time domain means that the third information is used for indirectly indicating a position of the time domain resource occupied by the first radio signal in time domain.

In one embodiment, the above phrase that the third information is used for indicating a position of the time domain resource occupied by the first radio signal in time domain means that the third information is used for explicitly indicating a position of the time domain resource occupied by the first radio signal in time domain.

In one embodiment, the above phrase that the third information is used for indicating a position of the time domain resource occupied by the first radio signal in time domain means that the third information is used for implicitly indicating a position of the time domain resource occupied by the first radio signal in time domain.

In one embodiment, the time domain resource occupied by the first radio signal is a candidate time domain resource of P candidate time domain resources. A position of the time domain resource occupied by the first radio signal in time domain refers to an index of the time domain resource occupied by the first radio signal in the P candidate time domain resources; the P is a positive integer greater than 1.

In one embodiment, the time domain resource occupied by the first radio signal is a candidate time domain resource of P candidate time domain resources. A position of the time domain resource occupied by the first radio signal in time domain refers to an order of the time domain resource occupied by the first radio signal in the P candidate time domain resources; the P is a positive integer greater than 1.

In one embodiment, the time domain resource occupied by the first radio signal belongs to one of the X time domain resource blocks in the present disclosure, a position of the time domain resource occupied by the first radio signal in time domain refers to a time domain position of a time domain resource block to which the time domain resource occupied by the first radio signal belongs in the X time domain resource blocks.

In one embodiment, the time domain resource occupied by the first radio signal belongs to one of the X time domain resource blocks in the present disclosure, a position of the time domain resource occupied by the first radio signal in time domain refers to an index of a time domain resource block to which the time domain resource occupied by the first radio signal belongs in the X time domain resource blocks.

In one embodiment, the time domain resource occupied by the first radio signal belongs to one of the X time domain resource blocks in the present disclosure, a position of the time domain resource occupied by the first radio signal in time domain refers to an order of a time domain resource block to which the time domain resource occupied by the first radio signal belongs in the X time domain resource blocks.

Embodiment 10

Figure 10:
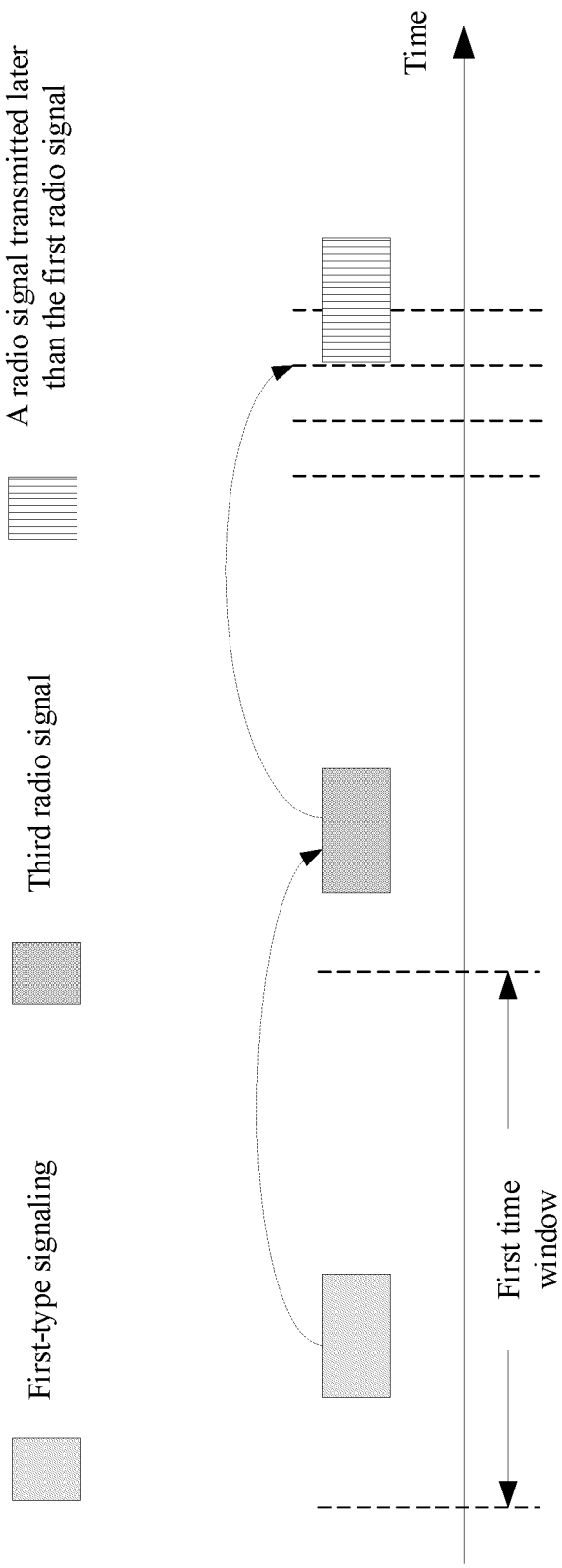
FIG. 10 illustrates a schematic diagram of a relation between a first signaling and a first radio signal according to one embodiment of the present disclosure.

Embodiment 10 illustrates a schematic diagram of a relation between a first signaling and a first radio signal according to one embodiment of the present disclosure, as shown in FIG. 10. In FIG. 10, the horizontal axis represents time, the slash-filled square represents a first-type signaling, the cross-filled square represents a third radio signal, and the square filled with straight lines represents a radio signal transmitted after a first radio signal.

In Embodiment 10, the first-type signaling of the present disclosure detected in the first time window of the present disclosure is used for determining time-frequency resources occupied by the third radio signal of the present disclosure; the third radio signal carries fourth information, the fourth information is used for determining a first timing advance, the first timing advance is used for determining a transmission timing of a radio signal transmitted later than the first radio signal.

In one embodiment, the third radio signal carries an Msg2 (random-access information 2).

In one embodiment, the third radio signal carries an MsgB (random-access information B).

In one embodiment, the third radio signal carries RAR.

In one embodiment, the third radio signal is used for random access process.

In one embodiment, the third radio signal is transmitted through a DL-SCH.

In one embodiment, the third radio signal is transmitted through a PDSCH.

In one embodiment, the above phrase that the first-type signaling detected in the first time window is used for determining time-frequency resources occupied by the third radio signal includes the meaning that the first-type signaling detected in the first time window is used by the first communication node in the present disclosure for determining time-frequency resources occupied by the third radio signal.

In one embodiment, the above phrase that the first-type signaling detected in the first time window is used for determining time-frequency resources occupied by the third radio signal includes the meaning that the first-type signaling detected in the first time window is used for directly indicating time-frequency resources occupied by the third radio signal.

In one embodiment, the above phrase that the first-type signaling detected in the first time window is used for determining time-frequency resources occupied by the third radio signal includes the meaning that the first-type signaling detected in the first time window is used for indirectly indicating time-frequency resources occupied by the third radio signal.

In one embodiment, the above phrase that the first-type signaling detected in the first time window is used for determining time-frequency resources occupied by the third radio signal includes the meaning that the first-type signaling detected in the first time window is used for explicitly indicating time-frequency resources occupied by the third radio signal.

In one embodiment, the above phrase that the first-type signaling detected in the first time window is used for determining time-frequency resources occupied by the third radio signal includes the meaning that the first-type signaling detected in the first time window is used for implicitly indicating time-frequency resources occupied by the third radio signal.

In one embodiment, the first-type signaling detected in the first time window is also used for determining a Modulation and Coding Scheme (MCS) employed by the third radio signal.

In one embodiment, the fourth information comprises an Msg2.

In one embodiment, the fourth information comprises an MsgB.

In one embodiment, the fourth information comprises higher layer information.

In one embodiment, the fourth information comprises physical layer information.

In one embodiment, the fourth information comprises all or part of a higher layer signaling.

In one embodiment, the fourth information comprises all or part of an RRC signaling.

In one embodiment, the fourth information comprises all or part of a MAC signaling.

In one embodiment, the fourth information comprises all or part of a MAC CE.

In one embodiment, the fourth information comprises all or part of a MAC Header.

In one embodiment, the fourth information comprises a Timing Advance Command.

In one embodiment, the above phrase that the fourth information is used for determining a first timing advance means that the fourth information is used by the first communication node of the present disclosure for determining the first timing advance.

In one embodiment, the above phrase that the fourth information is used for determining a first timing advance means that the fourth information is used for directly indicating the first timing advance.

In one embodiment, the above phrase that the fourth information is used for determining a first timing advance means that the fourth information is used for indirectly indicating the first timing advance.

In one embodiment, the above phrase that the fourth information is used for determining a first timing advance means that the fourth information is used for explicitly indicating the first timing advance.

In one embodiment, the above phrase that the fourth information is used for determining a first timing advance means that the fourth information is used for implicitly indicating the first timing advance.

In one embodiment, the first timing advance is a real number.

In one embodiment, the first timing advance is measured by millisecond ($\mu s$).

In one embodiment, the first timing advance is measured by second (s).

In one embodiment, the first timing advance is positive or the first timing advance is equal to 0.

In one embodiment, the first timing advance is negative or the first timing advance is equal to 0.

In one embodiment, the first timing advance is equal to an integer number of $T_c$, where $T_c=1/(480 \cdot 10^3 \cdot 4096)_s$.

In one embodiment, the first timing advance is related to a type of the second communication node in the present disclosure.

In one embodiment, the first timing advance is related to a height of the second communication node in the present disclosure.

In one embodiment, the first timing advance is related to a type of a satellite that the second communication node in the present disclosure belongs to.

In one embodiment, the above phrase that the first timing advance is used for determining a transmission timing of a radio signal transmitted later than the first radio signal includes the meaning that the first timing advance is used by the first communication node for determining a transmission timing of a radio signal later than the transmission of the first radio signal.

In one embodiment, the above phrase that the first timing advance is used for determining a transmission timing of a radio signal transmitted later than the first radio signal includes the meaning that the first timing advance is a TA of a radio signal transmitted later than the first radio signal.

In one embodiment, the above phrase that the first timing advance is used for determining a transmission timing of a radio signal transmitted later than the first radio signal includes the meaning that the first timing advance is a transmission timing of a virtual radio signal transmitted later than the first radio signal.

In one embodiment, the above phrase that the first timing advance is used for determining a transmission timing of a radio signal transmitted later than the first radio signal includes the meaning that the first timing advance is a transmission timing of an actual radio signal transmitted later than the first radio signal.

In one embodiment, the above phrase that the first timing advance is used for determining a transmission timing of a radio signal transmitted later than the first radio signal includes the meaning that when there is a radio signal transmitted later than the first radio signal, the first timing advance is used for determining a transmission timing of a radio signal transmitted later than the first radio signal.

In one embodiment, the above phrase that the first timing advance is used for determining a transmission timing of a radio signal transmitted later than the first radio signal includes the meaning that the first communication node in the present disclosure can assume that the first timing advance is used for determining a transmission timing of a radio signal transmitted later than the first radio signal.

Embodiment 11

Figure 11:
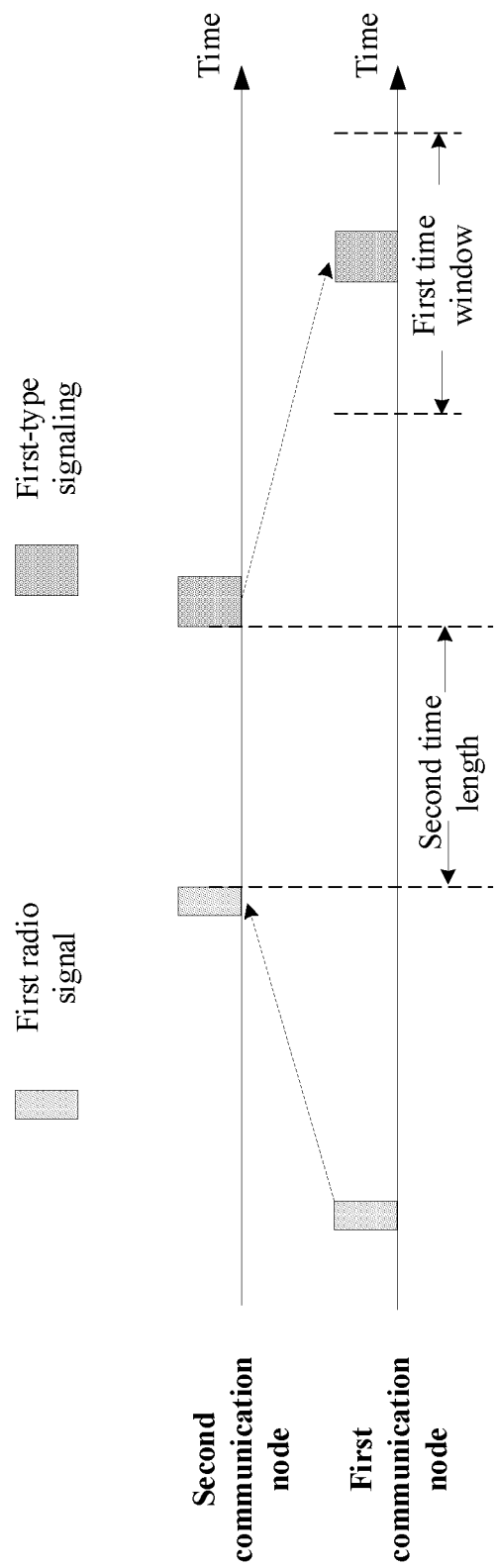
FIG. 11 illustrates a schematic diagram of a second time length according to one embodiment of the present disclosure.

Embodiment 11 illustrates a schematic diagram of a second time length according to one embodiment of the present disclosure, as shown in FIG. 11. In FIG. 11, the horizontal axis represents time; the slash-filled square represents a first radio signal, the cross-filled square represents a first-type signaling; and an orientation of each arrow marked with dotted lines represents a transmission direction between a first communication node and a second communication node.

In Embodiment 11, the fourth information in the present disclosure is used for determining a second time length, the first communication node in the present disclosure assumes that the second time length is equal to a length of a time interval between a reception time of the first radio signal in the present disclosure and a transmission time of the first-type signaling in the present disclosure.

In one embodiment, the above phrase that the first communication node in the present disclosure assumes that the second time length is equal to a length of a time interval between a reception time of the first radio signal in the present disclosure and a transmission time of the first-type signaling in the present disclosure means that: the first communication node in the present disclosure assumes that the second time length is equal to a length of a time interval between an end time for a reception of the first radio signal in the present disclosure and a start time for a transmission of the first-type signaling in the present disclosure.

In one embodiment, the above phrase that the first communication node in the present disclosure assumes that the second time length is equal to a length of a time interval between a reception time of the first radio signal in the present disclosure and a transmission time of the first-type signaling in the present disclosure means that: the first communication node in the present disclosure assumes that the second time length is equal to a length of a time interval between an end time for a reception of the first radio signal in the present disclosure and an end time for a transmission of the first-type signaling in the present disclosure.

In one embodiment, the above phrase that the first communication node in the present disclosure assumes that the second time length is equal to a length of a time interval between a reception time of the first radio signal in the present disclosure and a transmission time of the first-type signaling in the present disclosure means that: the first communication node in the present disclosure assumes that the second time length is equal to a length of a time interval between a start time for a reception of the first radio signal in the present disclosure and a start time for a transmission of the first-type signaling in the present disclosure.

In one embodiment, the above phrase that the first communication node in the present disclosure assumes that the second time length is equal to a length of a time interval between a reception time of the first radio signal in the present disclosure and a transmission time of the first-type signaling in the present disclosure means that: the first communication node in the present disclosure assumes that the second time length is equal to a length of a time interval between a start time for a reception of the first radio signal in the present disclosure and an end time for a transmission of the first-type signaling in the present disclosure.

In one embodiment, the above phrase that the fourth information is used for determining a second time length means that the fourth information is used by the first communication node in the present disclosure for determining the second time length.

In one embodiment, the above phrase that the fourth information is used for determining a second time length means that the fourth information is used for directly indicating the second time length.

In one embodiment, the above phrase that the fourth information is used for determining a second time length means that the fourth information is used for indirectly indicating the second time length.

In one embodiment, the above phrase that the fourth information is used for determining a second time length means that the fourth information is used for explicitly indicating the second time length.

In one embodiment, the above phrase that the fourth information is used for determining a second time length means that the fourth information is used for implicitly indicating the second time length.

In one embodiment, the second time length is actually equal to a length of a time interval between a reception time of the first radio signal and a transmission time of the first-type signaling.

In one embodiment, the second time length is not equal to a length of a time interval between a reception time of the first radio signal and a transmission time of the first-type signaling.

In one embodiment, the above phrase that the first communication node assumes that the second time length is equal to a length of a time interval between a reception time of the first radio signal and a transmission time of the first-type signalings means that the first communication node assumes that the second time length is equal to a length of a time interval between a reception time of the first radio signal and a transmission time of one first-type signaling detected in the first time window.

In one embodiment, the above phrase that the first communication node assumes that the second time length is equal to a length of a time interval between a reception time of the first radio signal and a transmission time of the first-type signalings means that the first communication node assumes that the second time length is equal to a length of a time interval between a reception time of the first radio signal and a transmission time of one first-type signaling for scheduling the third radio signal.

In one embodiment, the first communication node assumes that a length of a time interval between an end time of a transmission of the first radio signal and a start time of a reception of one first-type signaling detected in the first time window is equal to a third time length; the third time length is equal to a sum of the second time length and 2 times the first timing advance.

In one embodiment, the first communication node assumes that a length of a time interval between an end time of a transmission of the first radio signal and a start time of a reception of one of the first-type signaling for scheduling the third radio signal is equal to a third time length; the third time length is equal to a sum of the second time length and 2 times the first timing advance.

In one embodiment, a length of a time interval between an end time of a transmission of the first radio signal and a start time of a reception of one of the first-type signalings detected in the first time window is equal to a third time length; the first communication node determines whether the first timing advance is for a transmission from the first communication node by determining whether the third time length is equal to a sum of the second time length and 2 times the first timing advance.

In one embodiment, a length of a time interval between an end time of a transmission of the first radio signal and a start time of a reception of one of the first-type signalings detected in the first time window is equal to a third time length; the first communication node determines whether the first timing advance can be used for determining a transmission timing of the first communication node by determining whether the third time length is equal to a sum of the second time length and 2 times the first timing advance.

In one embodiment, a length of a time interval between an end time of a transmission of the first radio signal and a start time of a reception of one of the first-type signalings detected in the first time window is equal to a third time length; when the third time length is equal to a sum of the second time length and 2 times the first timing advance, then the first timing advance can be used for determining a transmission timing of the first communication node; when the third time length is unequal to a sum of the second time length and 2 times the first timing advance, then the first timing advance cannot be used for determining a transmission timing of the first communication node.

Embodiment 12

Figure 12:
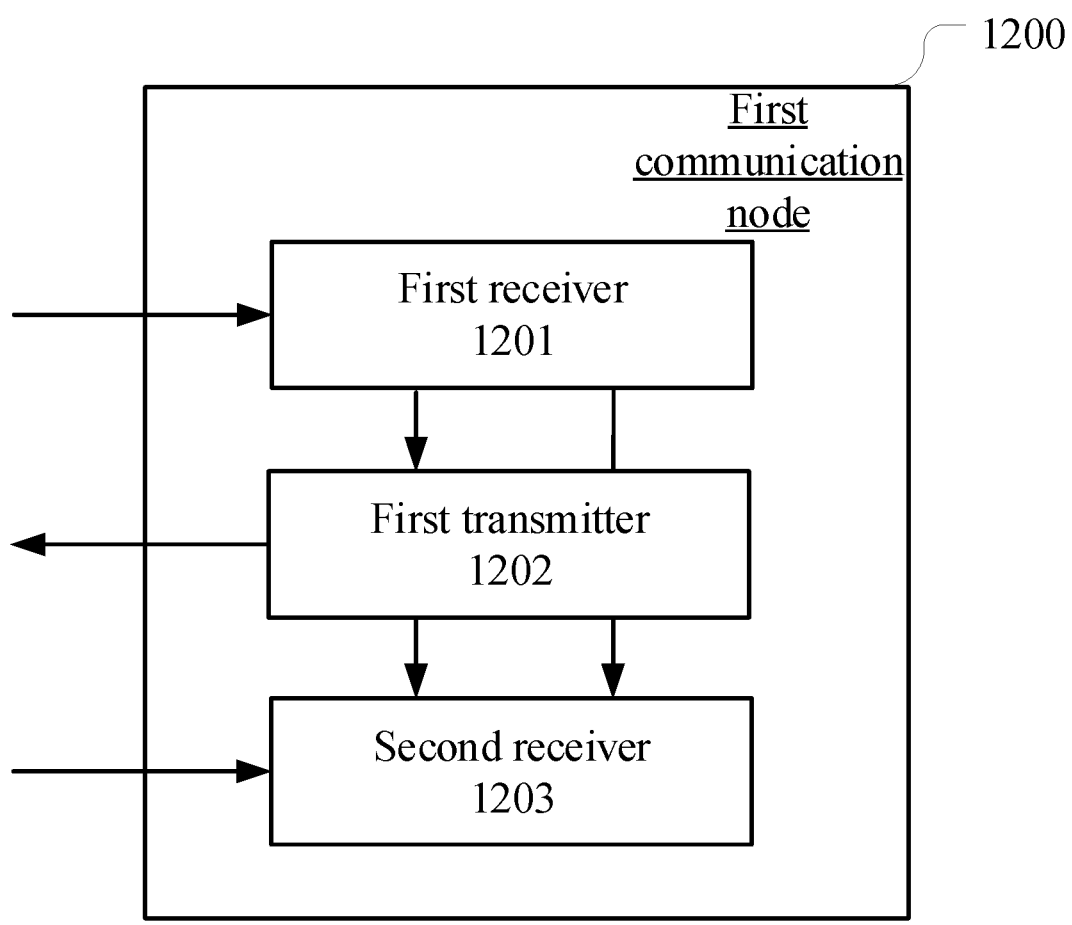
FIG. 12 illustrates a structure block diagram of a processing device in a first communication node according to one embodiment of the present disclosure.

Embodiment 12 illustrates a structure block diagram of a processing device in a first communication node, as shown in FIG. 12. In FIG. 12, a first communication node processing device 1200 comprises a first receiver 1201, a first transmitter 1202 and a second receiver 1203. The first receiver 1201 comprises the transmitter/receiver 456 (comprising the antenna 460), the receiving processor 452 and the controller/processor 490 in FIG. 4 of the present disclosure; the first transmitter 1202 comprises the transmitter/receiver 456 (comprising the antenna 460), the transmitting processor 455 and the controller/processor 490 in FIG. 4 of the present disclosure; the second receiver 1203 comprises the transmitter/receiver 456 (comprising the antenna 460), the receiving processor 452 and the controller/processor 490 in FIG. 4 of the present disclosure.

In Embodiment 12, the first receiver 1201 receives first information, the first transmitter 1202 transmits a first radio signal; and the second receiver 1203 monitors a first-type signaling in a first time window; herein, an end time for a transmission of the first radio signal is used for determining a start of the first time window, time domain resource occupied by the first radio signal is used for determining a first characteristic identity; the first characteristic identity is one of M characteristic identities, M is a positive integer greater than 1, the first information is used for determining the M characteristic identities; the first-type signaling carries one of the M characteristic identities, the first communication node determines a characteristic identity carried by the first-type signaling out of the M characteristic identities through blind detection.

In one embodiment, the first information is used for determining a first time length, the time domain resource occupied by the first radio signal and the first time length are used for determining X time domain resource blocks, the X time domain resource blocks are divided into M time domain resource block groups, time-domain positions of the M time domain resource block groups are respectively used for determining the M characteristic identities, X is a positive integer no less than the M.

In one embodiment, radio resources occupied by the first radio signal belong to a radio resource block in a first radio resource block set, the first radio resource block set comprises a positive integer number of radio resource blocks; the first communication node randomly selects the radio resources occupied by the first radio signal from the first radio resource block set; the first radio resource block set is one of W candidate radio resource block sets, W is a positive integer number greater than 1, a position of the first radio resource block set among the W candidate radio resource block sets is used for indicating a positioning capability of the first communication node.

In one embodiment, the first receiver 1201 receives second information; the second information is used for determining a length of a time interval between a start of the first time window and an end time for a transmission of the first radio signal.

In one embodiment, the first transmitter 1202 transmits a second radio signal; the second radio signal carries third information, the third information is used for indicating a position of the time domain resource occupied by the first radio signal in time domain, a start time for a transmission of the second radio signal is later than the end time for the transmission of the first radio signal.

In one embodiment, the first information is used for determining a length of the first time window.

In one embodiment, the second receiver 1203 receives a third radio signal, the first-type signaling detected in the first time window is used for determining time-frequency resources occupied by the third radio signal; the third radio signal carries fourth information, the fourth information is used for determining a first timing advance, and the first timing advance is used for determining a transmission timing of a radio signal transmitted later than the first radio signal.

In one embodiment, the second receiver 1203 receives a third radio signal, the first-type signaling detected in the first time window is used for determining time-frequency resources occupied by the third radio signal; the third radio signal carries fourth information, the fourth information is used for determining a first timing advance, and the first timing advance is used for determining a transmission timing of a radio signal transmitted later than the first radio signal; the fourth information is used for determining a second time length; the first communication node assumes that the second time length is equal to a length of a time interval between a reception time of the first radio signal and a transmission time of the first-type signaling.

Embodiment 13

Figure 13:
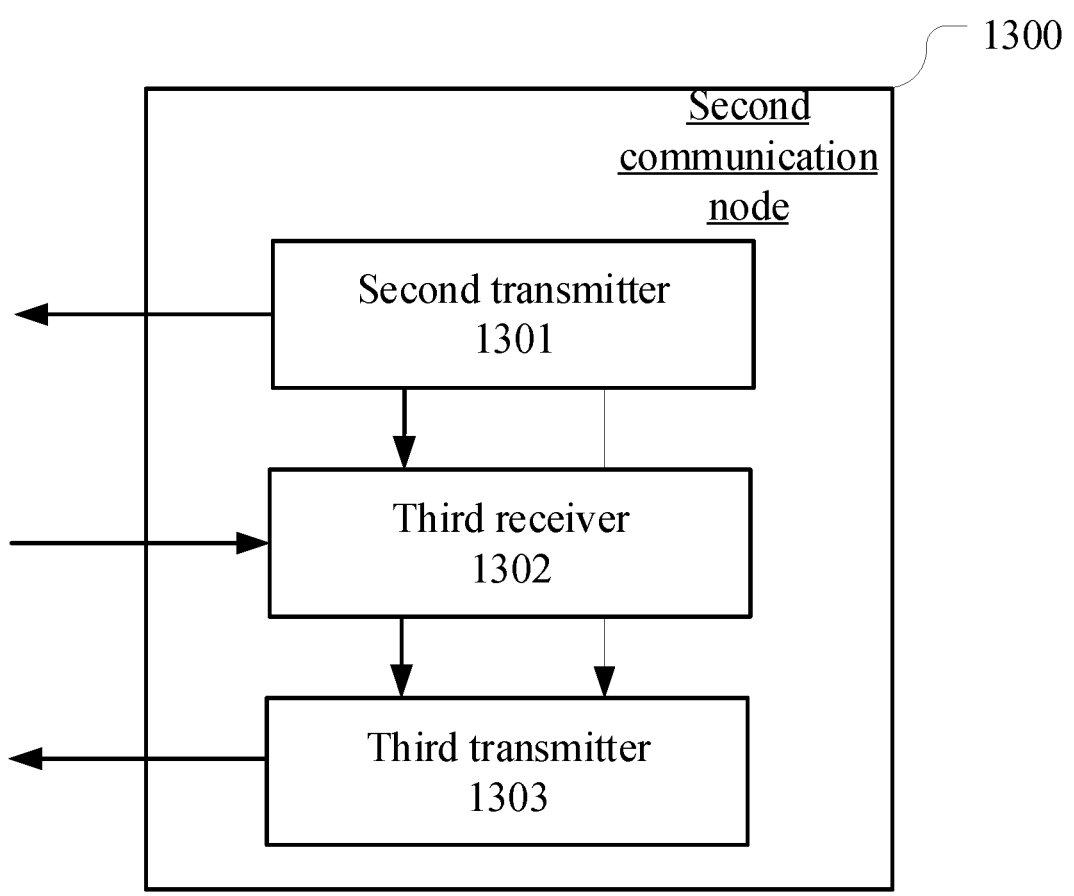
FIG. 13 illustrates a structure block diagram of a processing device in a second communication node according to one embodiment of the present disclosure.

Embodiment 13 illustrates a structure block diagram of a processing device in a second communication node according to one embodiment of the present disclosure, as shown in FIG. 13. In FIG. 13, the second communication node processing device 1300 comprises a second transmitter 1301, a third receiver 1302 and a third transmitter 1303. The second transmitter 1301 comprises the transmitter/receiver 416 (comprising the antenna 420), the transmitting processor 415 and the controller/processor 440 in FIG. 4 of the present disclosure; the third receiver 1302 comprises the transmitter/receiver 416 (comprising the antenna 420), the receiving processor 412 and the controller/processor 440 in FIG. 4 of the present disclosure; the third transmitter 1303 comprises the transmitter 416 (comprising the antenna 420), the transmitting processor 415 and the controller/processor 440 in FIG. 4 of the present disclosure.

In Embodiment 13, the second transmitter 1301 transmits first information; the third receiver 1302 receives a first radio signal; the third transmitter 1303 transmits a first-type signaling in a first time window; herein, an end time for a transmission of the first radio signal is used for determining a start of the first time window, time domain resource occupied by the first radio signal is used for determining a first characteristic identity; the first characteristic identity is one of M characteristic identities, M is a positive integer greater than 1, the first information is used for determining the M characteristic identities; the first-type signaling carries one of the M characteristic identities, the first communication node determines a characteristic identity carried by the first-type signaling out of the M characteristic identities through blind detection.

In one embodiment, the first information is used for determining a first time length, the time domain resource occupied by the first radio signal and the first time length are used for determining X time domain resource blocks, the X time domain resource blocks are divided into M time domain resource block groups, time-domain positions of the M time domain resource block groups are respectively used for determining the M characteristic identities, X is a positive integer no less than the M.

In one embodiment, radio resources occupied by the first radio signal belong to a radio resource block in a first radio resource block set, the first radio resource block set comprises a positive integer number of radio resource blocks; the first communication node randomly selects the radio resources occupied by the first radio signal from the first radio resource block set; the first radio resource block set is one of W candidate radio resource block sets, W is a positive integer number greater than 1, a position of the first radio resource block set among the W candidate radio resource block sets is used for indicating a positioning capability of the first communication node.

In one embodiment, the second transmitter 1301 transmits second information; herein, the second information is used for determining a length of a time interval between the start of the first time window and the end time for the transmission of the first radio signal.

In one embodiment, the third receiver 1302 receives a second radio signal; herein, the second radio signal carries third information, the third information is used for indicating a position of the time domain resource occupied by the first radio signal in time domain, a start time for a transmission of the second radio signal is later than the end time for the transmission of the first radio signal.

In one embodiment, the first information is used for determining a length of the first time window.

In one embodiment, the third transmitter 1303 transmits a third radio signal; herein, the first-type signaling detected in the first time window is used for determining time-frequency resources occupied by the third radio signal; the third radio signal carries fourth information, the fourth information is used for determining a first timing advance, and the first timing advance is used for determining a transmission timing of a radio signal transmitted later than the first radio signal In one embodiment, the third transmitter 1303 transmits a third radio signal; herein, the first-type signaling detected in the first time window is used for determining time-frequency resources occupied by the third radio signal; the third radio signal carries fourth information, the fourth information is used for determining a first timing advance, and the first timing advance is used for determining a transmission timing of a radio signal transmitted later than the first radio signal; the fourth information is used for determining a second time length; the first communication node assumes that the second time length is equal to a length of a time interval between a reception time of the first radio signal and a transmission time of the first-type signaling.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first communication node or UE or terminal in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The second communication node or base station or network side equipment in the present disclosure includes but is not limited to macro-cellular base stations, micro-cellular base stations, home base stations, relay base station, eNB, gNB, Transmitter Receiver Point (TRP), relay satellites, satellite base station, aerial base station, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first communication node used for wireless communications, comprising:
    a first receiver, receiving first information;
    a first transmitter, transmitting a first radio signal; and
    a second receiver, monitoring a first-type signaling in a first time window; wherein:
    an end time for a transmission of the first radio signal is used for determining a start of the first time window;
    time-domain resource(s) occupied by the first radio signal is(are) used for determining a first characteristic identity;
    the first characteristic identity is one of M characteristic identities, M being a positive integer greater than 1;
    the first information is used for determining the M characteristic identities;
    the first-type signaling carries one of the M characteristic identities;
    the first communication node determines a characteristic identity carried by the first-type signaling out of the M characteristic identities through blind detection; and
    any of the M characteristic identities is an RNTI.

2. The first communication node according to claim 1, wherein:
    the first information is used for determining a first time length;
    the time-domain resource(s) occupied by the first radio signal and the first time length are used for determining X time-domain resource blocks;
    the X time-domain resource blocks are divided into M time-domain resource block groups;
    time-domain positions of the M time-domain resource block groups are respectively used for determining the M characteristic identities; and
    X is a positive integer no less than the M.

3. The first communication node according to claim 1, wherein:
    radio resources occupied by the first radio signal belong to a radio resource block in a first radio resource block set;
    the first radio resource block set comprises a positive integer number of radio resource blocks;
    the first communication node randomly selects the radio resources occupied by the first radio signal from the first radio resource block set;
    the first radio resource block set is one of W candidate radio resource block sets, W being a positive integer number greater than 1; and
    a position of the first radio resource block set among the W candidate radio resource block sets is used for indicating a positioning capability of the first communication node.

4. The first communication node according to claim 1, wherein:
    the first receiver receives second information determining a length of a time interval between a start of the first time window and an end time for a transmission of the first radio signal; or
    the first transmitter transmits a second radio signal carrying third information for indicating a position of the time-domain resource(s) occupied by the first radio signal in time domain, and a start time for a transmission of the second radio signal is later than an end time for a transmission of the first radio signal.

5. The first communication node according to claim 1, wherein
    the second receiver receives a third radio signal;
    the first-type signaling detected in the first time window is used for determining time-frequency resources occupied by the third radio signal;
    the third radio signal carries fourth information;

the fourth information is used for determining a first timing advance; and the first timing advance is used for determining a transmission timing of a radio signal transmitted later than the first radio signal.

6. A second communication node used for wireless communications, comprising:
a second transmitter, transmitting first information;
a third receiver, receiving a first radio signal; and
a third transmitter, transmitting a first-type signaling in a first time window; wherein:
an end time for a transmission of the first radio signal is used for determining a start of the first time window;
time-domain resource(s) occupied by the first radio signal is(are) used for determining a first characteristic identity;
the first characteristic identity is one of M characteristic identities, M being a positive integer greater than 1;
the first information is used for determining the M characteristic identities;
the first-type signaling carries one of the M characteristic identities;
a transmitter of the first radio signal determines a characteristic identity carried by the first-type signaling out of the M characteristic identities through blind detection; and
any of the M characteristic identities is an RNTI.

7. The second communication node according to claim 6, wherein:
the first information is used for indicating a first time length;
the time-domain resource(s) occupied by the first radio signal and the first time length are used for determining X time-domain resource blocks;
the X time-domain resource blocks are divided into M time-domain resource block groups;
time-domain positions of the M time-domain resource block groups are respectively used for determining the M characteristic identities; and
X is a positive integer no less than the M.

8. The second communication node according to claim 6, wherein:
radio resources occupied by the first radio signal belong to a radio resource block in a first radio resource block set;
the first radio resource block set comprises a positive integer number of radio resource blocks;
the first communication node randomly selects the radio resources occupied by the first radio signal from the first radio resource block set;
the first radio resource block set is one of W candidate radio resource block sets, W being a positive integer number greater than 1; and
a position of the first radio resource block set among the W candidate radio resource block sets is used for indicating a positioning capability of the first communication node.

9. The second communication node according to claim 6, wherein:
the second transmitter transmits second information for indicating a length of a time interval between a start of the first time window and an end time for a transmission of the first radio signal; or
wherein the third receiver receives a second radio signal carrying third information for indicating a position of the time-domain resource(s) occupied by the first radio signal in time domain, and a start time for a transmission of the second radio signal is later than an end time for a transmission of the first radio signal.

10. The second communication node according to claim 6, wherein:
the third transmitter transmits a third radio signal;
the first-type signaling detected in the first time window is used for determining time-frequency resources occupied by the third radio signal;
the third radio signal carries fourth information for determining a first timing advance; and
the first timing advance is used for determining a transmission timing of a radio signal transmitted later than the first radio signal.

11. A method in a first communication node used for wireless communications, comprising:
receiving first information;
transmitting a first radio signal; and
monitoring a first-type signaling in a first time window; wherein:
an end time for a transmission of the first radio signal is used for determining a start of the first time window;
time-domain resource(s) occupied by the first radio signal is(are) used for determining a first characteristic identity;
the first characteristic identity is one of M characteristic identities, M being a positive integer greater than 1;
the first information is used for determining the M characteristic identities;
the first-type signaling carries one of the M characteristic identities;
the first communication node determines a characteristic identity carried by the first-type signaling out of the M characteristic identities through blind detection; and
any of the M characteristic identities is an RNTI.

12. The method in the first communication node according to claim 11, wherein:
the first information is used for determining a first time length;
the time-domain resource(s) occupied by the first radio signal and the first time length are used for determining X time-domain resource blocks;
the X time-domain resource blocks are divided into M time-domain resource block groups;
time-domain positions of the M time-domain resource block groups are respectively used for determining the M characteristic identities; and
X is a positive integer no less than the M.

13. The method in the first communication node according to claim 11, wherein:
radio resources occupied by the first radio signal belong to a radio resource block in a first radio resource block set;
the first radio resource block set comprises a positive integer number of radio resource blocks;
the first communication node randomly selects the radio resources occupied by the first radio signal from the first radio resource block set;
the first radio resource block set is one of W candidate radio resource block sets, W being a positive integer number greater than 1; and
a position of the first radio resource block set among the W candidate radio resource block sets is used for indicating a positioning capability of the first communication node.

14. The method in the first communication node according to claim 11, comprising:

receiving second information, wherein the second information is used for determining a length of a time interval between a start of the first time window and an end time for a transmission of the first radio signal; or transmitting a second radio signal, wherein the second radio signal carries third information for indicating a position of the time-domain resource(s) occupied by the first radio signal in time domain, and a start time for a transmission of the second radio signal is later than an end time for a transmission of the first radio signal.

15. The method in the first communication node according to claim 11, comprising:

receiving a third radio signal; wherein:

the first-type signaling detected in the first time window is used for determining time-frequency resources occupied by the third radio signal carrying fourth information for determining a first timing advance and the first timing advance is used for determining a transmission timing of a radio signal transmitted later than the first radio signal.

16. A method in a second communication node used for wireless communications, comprising:

transmitting first information;

receiving a first radio signal; and transmitting a first-type signaling in a first time window; wherein:

an end time for a transmission of the first radio signal is used for determining a start of the first time window;

time-domain resource(s) occupied by the first radio signal is(are) used for determining a first characteristic identity;

the first characteristic identity is one of M characteristic identities, M being a positive integer greater than 1;

the first information is used for determining the M characteristic identities;

the first-type signaling carries one of the M characteristic identities;

a transmitter of the first radio signal determines a characteristic identity carried by the first-type signaling out of the M characteristic identities through blind detection; and any of the M characteristic identities is an RNTI.

17. The method in the second communication node according to claim 16, wherein:

the first information is used for indicating a first time length;

the time-domain resource(s) occupied by the first radio signal and the first time length are used for determining X time-domain resource blocks;

the X time-domain resource blocks are divided into M time-domain resource block groups;

time-domain positions of the M time-domain resource block groups are respectively used for determining the M characteristic identities; and X is a positive integer no less than the M.

18. The method in the second communication node according to claim 16, wherein:

radio resources occupied by the first radio signal belong to a radio resource block in a first radio resource block set;

the first radio resource block set comprises a positive integer number of radio resource blocks;

the first communication node randomly selects the radio resources occupied by the first radio signal from the first radio resource block set;

the first radio resource block set is one of W candidate radio resource block sets;

W is a positive integer number greater than 1; and a position of the first radio resource block set among the W candidate radio resource block sets is used for indicating a positioning capability of the first communication node.

19. The method in the second communication node according to claim 16, comprising:

transmitting second information, wherein the second information is used for indicating a length of a time interval between a start of the first time window and an end for a transmission of the first radio signal; or receiving a second radio signal, wherein the second radio signal carries third information for indicating a position of the time-domain resource(s) occupied by the first radio signal in time domain, and a start time for a transmission of the second radio signal is later than the end time for the transmission of the first radio signal.

20. The method in the second communication node according to claim 16, comprising:

transmitting a third radio signal; wherein:

the first-type signaling detected in the first time window is used for determining time-frequency resources occupied by the third radio signal;

the third radio signal carries fourth information for determining a first timing advance and the first timing advance is used for determining a transmission timing of a radio signal transmitted later than the first radio signal.

* * * * *